(12) United States Patent
Chen et al.

(10) Patent No.: US 10,171,598 B2
(45) Date of Patent: Jan. 1, 2019

(54) METHOD AND SYSTEM FOR LOCATION SHARING

(71) Applicant: Tencent Technology (Shenzhen) Company Limited, Shenzhen (CN)

(72) Inventors: Pinlin Chen, Shenzhen (CN); Yi Shan, Shenzhen (CN); Jun Wang, Shenzhen (CN); Liang Wu, Shenzhen (CN); Ling Li, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 390 days.

(21) Appl. No.: 14/993,995

(22) Filed: Jan. 12, 2016

(65) Prior Publication Data

US 2016/0127486 A1 May 5, 2016

Related U.S. Application Data

(63) Continuation of application No. PCT/CN2015/070685, filed on Jan. 14, 2015.

(30) Foreign Application Priority Data

Jan. 24, 2014 (CN) .......................... 2014 1 0035199

(51) Int. Cl.
*G06F 15/16* (2006.01)
*H04L 29/08* (2006.01)
(Continued)

(52) U.S. Cl.
CPC .......... *H04L 67/18* (2013.01); *G06F 3/04817* (2013.01); *G06F 3/04842* (2013.01);
(Continued)

(58) Field of Classification Search
CPC .......... H04L 67/18; H04L 51/04; H04L 41/22; H04W 4/029; H04W 4/023; H04W 12/08; G06F 3/04842; G06F 3/04817
(Continued)

(56) References Cited

U.S. PATENT DOCUMENTS

| 2009/0098888 A1* | 4/2009 | Yoon | .................. | H04M 1/72572 |
| | | | | 455/456.2 |
| 2013/0082874 A1* | 4/2013 | Zhang | .................. | G01S 5/0072 |
| | | | | 342/357.31 |

(Continued)

FOREIGN PATENT DOCUMENTS

| CN | 101600153 A | 12/2009 | | |
| CN | 102147810 | * 8/2011 | ............. | H04L 29/08 |

(Continued)

OTHER PUBLICATIONS

Tencent Technologies, ISRWO, PCT/CN2015/070685, Apr. 21, 2015, 9 pgs.

(Continued)

*Primary Examiner* — Frantz B Jean
(74) *Attorney, Agent, or Firm* — Morgan, Lewis & Bockius LLP

(57) ABSTRACT

Method and server system for location sharing are disclosed. The method includes: determining a motion state of a first user in accordance with respective information items related to a current location and a previous location of a first device associated with the first user; in accordance with a determination that the motion state of the first user is a stationary state, determining a user direction of the first user based an orientation of the first device associated with the current location; in accordance with a determination that the motion state of the first user is a moving state, determining the user direction of the first user based on a motion direction from the previous location to the current location of the first (Continued)

device; and sending the determined user direction of the first user to one or more second devices associated with one or more second users for location sharing.

16 Claims, 20 Drawing Sheets

(51) Int. Cl.
| | |
|---|---|
| *H04W 4/029* | (2018.01) |
| *H04W 4/02* | (2018.01) |
| *H04W 12/08* | (2009.01) |
| *G06F 3/0481* | (2013.01) |
| *G06F 3/0484* | (2013.01) |
| *H04L 12/24* | (2006.01) |
| *H04L 12/58* | (2006.01) |

(52) U.S. Cl.
CPC .............. *H04L 41/22* (2013.01); *H04L 51/04* (2013.01); *H04W 4/023* (2013.01); *H04W 4/029* (2018.02); *H04W 12/08* (2013.01)

(58) Field of Classification Search
USPC ........................................................ 709/206
See application file for complete search history.

(56) References Cited

U.S. PATENT DOCUMENTS

| | | | | |
|---|---|---|---|---|
| 2013/0124315 A1* | 5/2013 | Doughty | ............ | G06Q 30/0269 705/14.53 |
| 2014/0019552 A1* | 1/2014 | Oh | ...................... | H04L 12/1818 709/204 |
| 2014/0309934 A1* | 10/2014 | Ricci | ....................... | H04W 4/21 701/537 |
| 2015/0350841 A1* | 12/2015 | Dal Santo | ............. | H04W 4/029 455/456.3 |
| 2016/0085386 A1* | 3/2016 | Bridge | ................ | H04L 65/1003 715/733 |
| 2017/0067747 A1* | 3/2017 | Ricci | .................. | G01C 21/3415 |
| 2017/0352250 A1* | 12/2017 | de Barros Chapiewski | ................ | H04W 4/029 |

FOREIGN PATENT DOCUMENTS

| | | |
|---|---|---|
| CN | 102147810 A | 8/2011 |
| CN | 102223602 A | 10/2011 |
| CN | 102740228 A | 10/2012 |
| CN | 103812931 A | 5/2014 |
| WO | WO 2012144833 A2 | 10/2012 |

OTHER PUBLICATIONS

Tencent Technologies, IPRP, PCT/CN2015/070685, Jul. 26, 2016, 6 pgs.

* cited by examiner

METHOD AND SYSTEM FOR LOCATION SHARING

PRIORITY CLAIM AND RELATED APPLICATION

This application is a continuation application of PCT Patent Application No. PCT/CN2015/070685, entitled "METHOD AND SYSTEM FOR LOCATION SHARING" filed on Jan. 14, 2015, which claims priority to Chinese Patent Application No. 201410035199.1, entitled "Method, Apparatus, and System for Sharing User Information" filed on Jan. 24, 2014, both of which are incorporated by reference in their entirety.

TECHNICAL FIELD

The disclosed implementations relate generally to the field of computer and internet data processing technology, and in particular, to method and system for location sharing.

BACKGROUND

With continuous development of electronic technologies and computer technologies, users are able to communicate with each other using instant messaging applications and social communication applications. A user's photos and images may be shared with other users, and a user's emotions may also be shared by words or emoticons with other users. It is desirable to have a method and a computer system for location sharing among users in the network effectively and efficiently, so that these users may be able to find each other quickly.

SUMMARY

The embodiments of the present disclosure provide methods and systems for location sharing.

In some embodiments, a method for location sharing is performed at a server system (e.g., server system 108, FIGS. 1-2) with one or more processors, and memory. The method includes: determining a motion state of a first user in accordance with respective information items related to a current location and a previous location of a first device associated with the first user; in accordance with a determination that the motion state of the first user is a stationary state, determining a user direction of the first user based an orientation of the first device associated with the current location of the first device; in accordance with a determination that the motion state of the first user is a moving state, determining the user direction of the first user based on a motion direction from the previous location to the current location of the first device; and sending the determined user direction of the first user to one or more second devices associated with one or more second users, wherein the one or more second users are associated with the first user for location sharing, and the determined user direction and the current location of the first user are graphically represented on a map interface on each of the one or more second devices.

In some embodiments, a server system (e.g., server system 108, FIGS. 1-2), includes one or more processors, and memory storing one or more programs for execution by the one or more processors, the one or more programs include instructions for performing the operations of any of the methods described herein.

In some embodiments, a non-transitory computer readable storage medium storing one or more programs, the one or more programs comprising instructions, which, when executed by a server system (e.g., server system 108, FIGS. 1-2), cause the server system to perform the operations of any of the methods described herein. In some embodiments, a server system (e.g., server system 108, FIGS. 1-2) includes means for performing, or controlling performance of, the operations of any of the methods described herein.

Various advantages of the present application are apparent in light of the descriptions below.

BRIEF DESCRIPTION OF THE DRAWINGS

The aforementioned features and advantages of the disclosed technology as well as additional features and advantages thereof will be more clearly understood hereinafter as a result of a detailed description of preferred embodiments when taken in conjunction with the drawings.

To illustrate the technical solutions according to the embodiments of the present application more clearly, the accompanying drawings for describing the embodiments are introduced briefly in the following. The accompanying drawings in the following description are only some embodiments of the present application; persons skilled in the art may obtain other drawings according to the accompanying drawings without paying any creative effort.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The technical solution of the present application will be clearly and completely described in the following with reference to the accompanying drawings. It is obvious that the embodiments to be described are only a part rather than all of the embodiments of the present application. All other embodiments obtained by persons of ordinary skill in the art based on the embodiments of the present application without creative efforts shall fall within the protection scope of the present application.

In some embodiments of location sharing among one or more users on an electronic map interface, an avatar is displayed next to a dot to prompt a location of another user to a user. Such a manner displays very little information, and cannot better meet information sharing demands of users.

The user information sharing method according to the embodiments of the present application is applicable to a mobile device, where the mobile device determines its own motion state based on its own location information, acquires user direction information or moving direction information which can be detected by the device according to the determined motion state of the user, and shares the user direction information or moving direction information with other user devices.

The method disclosed in the present application is also applicable to a server system, where the server system determines a motion state of a mobile device associated with a user, acquires direction information or moving direction information detected by the device according to the determined motion state, and shares the user direction information or moving direction information with other user devices.

Figure 1:
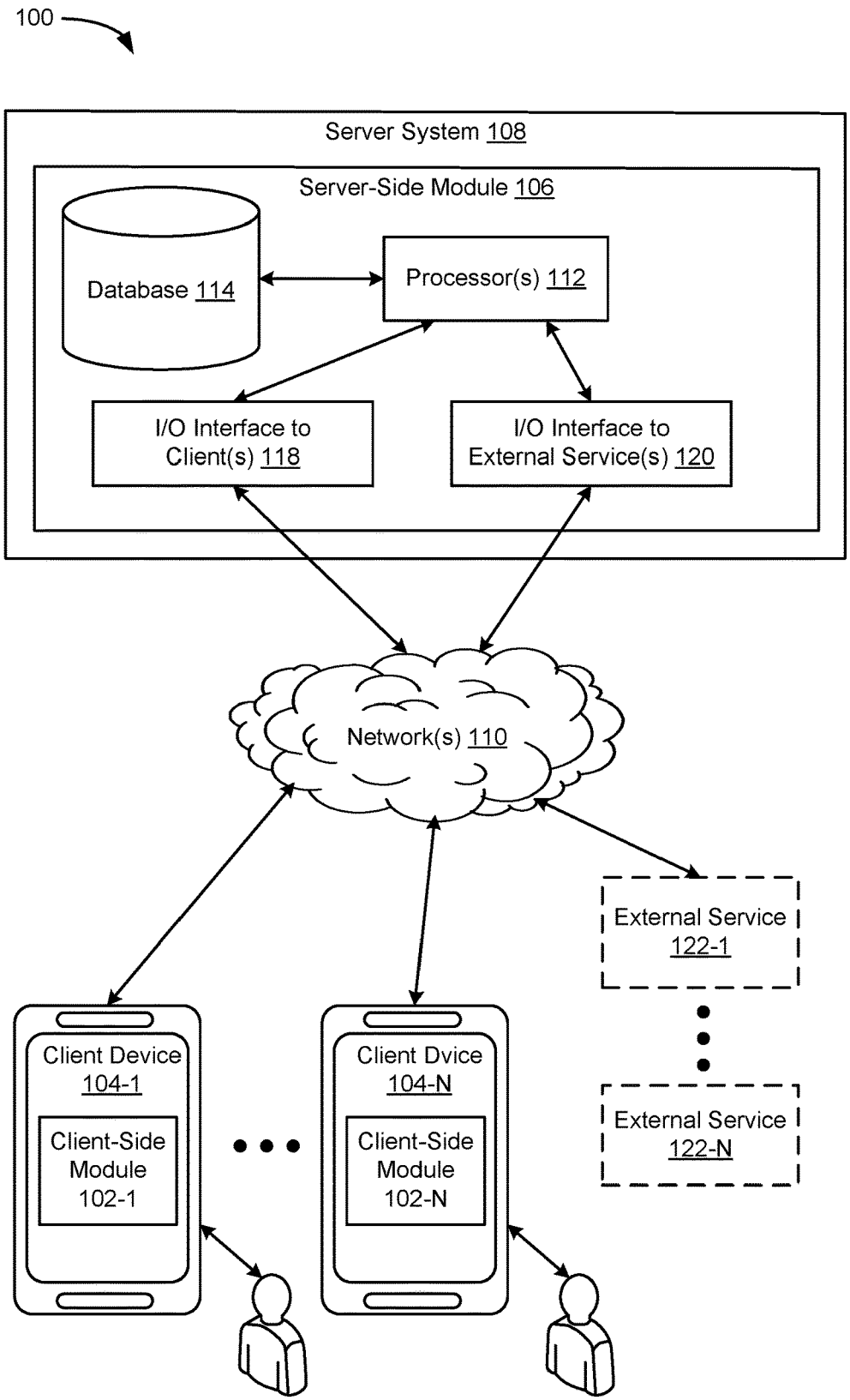
FIG. 1 is a block diagram of a server-client environment in accordance with some embodiments.

As shown in FIG. 1, location sharing is implemented in a server-client environment 100 in accordance with some embodiments. In some embodiments, server-client environment 100 includes client-side processing 102-1 . . . 102-N (hereinafter "client-side module 102") executed on a client device 104-1 . . . 104-N, and server-side processing 106 (hereinafter "server-side module 106") executed on a server system 108. Client-side module 102 communicates with server-side module 106 through one or more networks 110. Client-side module 102 provides client-side functionalities for the social networking platform (e.g., instant messaging, and social networking services) and communications with server-side module 106. Server-side module 106 provides server-side functionalities for the social networking platform (e.g., instant messaging, and social networking services) for any number of client modules 102 each residing on a respective client device 104.

In some embodiments, server-side module 106 includes one or more processors 112, one or more databases 114, an I/O interface to one or more clients 118, and an I/O interface to one or more external services 120. I/O interface to one or more clients 118 facilitates the processing of input and output associated with the client devices for server-side module 106. One or more processors 112 obtain instant messages from a plurality of users, process the instant messages, process location information of a client device, and share location information of the client device to client-side modules 102 of one or more client devices. The database 114 stores various information, including but not limited to, map information, service categories, service provider names, and the corresponding locations. The database 114 may also store a plurality of record entries relevant to the users associated with location sharing, and the instant messages exchanged among the users for location sharing. I/O interface to one or more external services 120 facilitates communications with one or more external services 122 (e.g., merchant websites, credit card companies, and/or other processing services).

Examples of client device 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more standalone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108.

Server-client environment 100 shown in FIG. 1 includes both a client-side portion (e.g., client-side module 102) and a server-side portion (e.g., server-side module 106). In some embodiments, data processing is implemented as a standalone application installed on client device 104. In addition, the division of functionalities between the client and server portions of client environment data processing can vary in different embodiments. For example, in some embodiments, client-side module 102 is a thin-client that provides only user-facing input and output processing functions, and delegates all other data processing functionalities to a backend server (e.g., server system 108).

Figure 2:
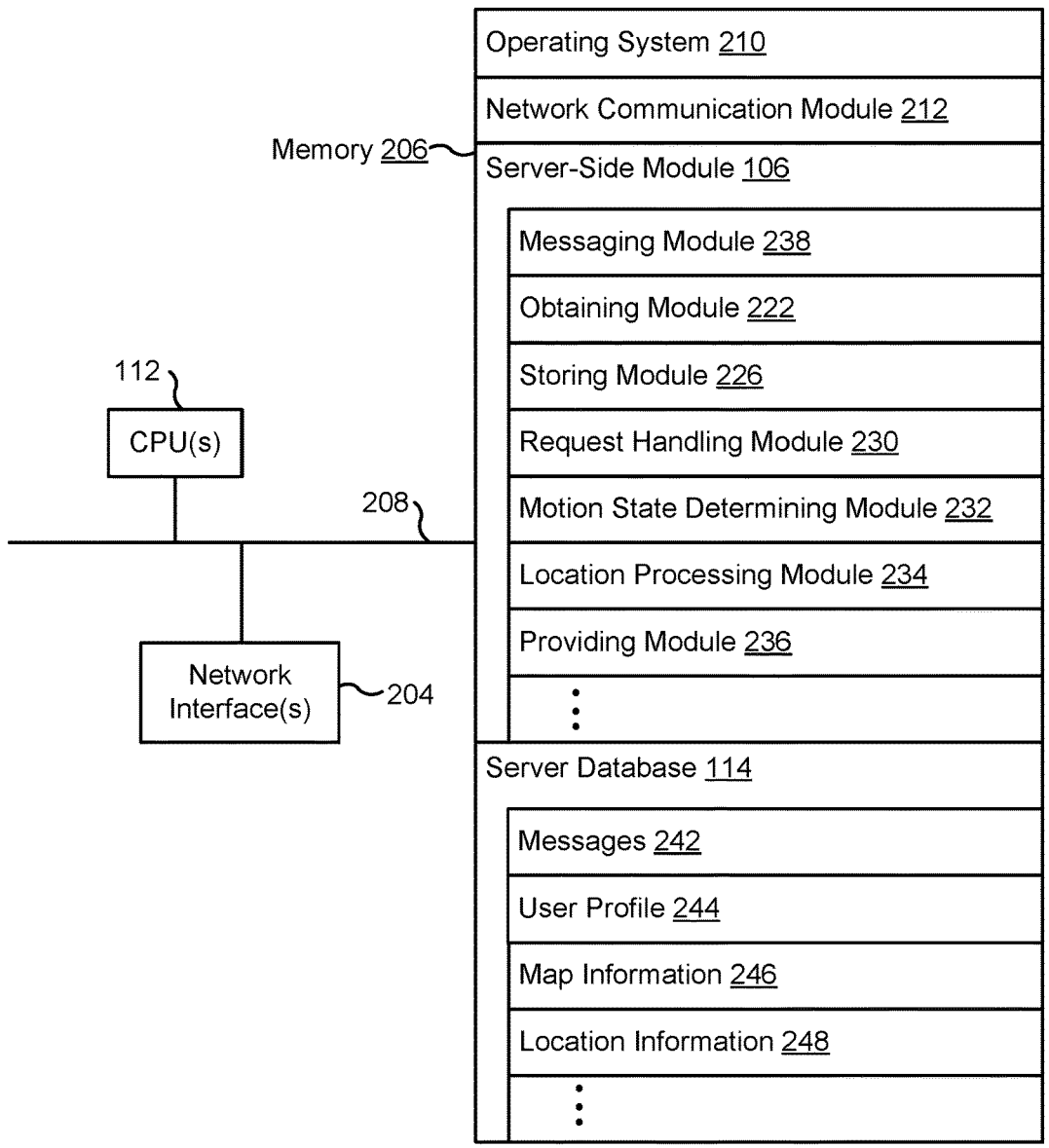
FIG. 2 is a block diagram of a server system in accordance with some embodiments.

FIG. 2 is a block diagram illustrating a server system 108 in accordance with some embodiments. Server system 108, typically, includes one or more processing units (CPUs) 112, one or more network interfaces 204 (e.g., including I/O interface to one or more clients 118 and I/O interface to one or more external services 120), memory 206, and one or more communication buses 208 for interconnecting these components (sometimes called a chipset).

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 112. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

operating system 210 including procedures for handling various basic system services and for performing hardware dependent tasks;

network communication module 212 for connecting server system 108 to other computing devices (e.g., client devices 104 and external service(s) 122) connected to one or more networks 110 via one or more network interfaces 204 (wired or wireless);

server-side module 106, which provides server-side data processing for the social networking platform (e.g., location information processing and sharing, instant messaging, and social networking services), includes, but is not limited to:

messaging module 238 for processing and routing instant messages exchanged among a first user and one or more second users of a social networking platform;

obtaining module 222 for obtaining location information of the first user from a client device 104 associated with the first user;

storing module 226 for storing various information in the database 114, the various information including map information, service categories, server provider names, user locations, and entries relevant to the instant messages exchanged during a chat session;

request handling module 230 for handling and responding to various requests sent from client devices of the social networking platform;

motion state determining module 232 for determining a motion state of the user in accordance with the current location information and previous location information of the user;

location processing module 234 for processing location information of the user for sharing, including determining the user direction in accordance with the determined motion state of the user; and providing module 236 for providing the location information of the user to one or more second users for sharing; and one or more server database 114 storing data for the social networking platform, including but not limited to:

messages 242 storing messages exchanged among a plurality of users associated with location sharing;

user profiles 244 storing user profiles for the plurality of users associated with location sharing, wherein a respective user profile for a user may include a user/account name or handle, login credentials to the social networking platform, location information of the user (e.g., previous location information), payment data (e.g., linked credit card information, app credit or gift card balance, billing address, shipping address, etc.), custom parameters (e.g., age, location, hobbies, etc.) for the user, social network contacts, groups of contacts to which the user belongs, and identified trends and/or likes/dislikes of the user;

map information 246 storing geographical information of various locations, including geographical locations, and various services and business on the maps; and location information 248 storing location information associated with one or more of the plurality of users associated with location sharing.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
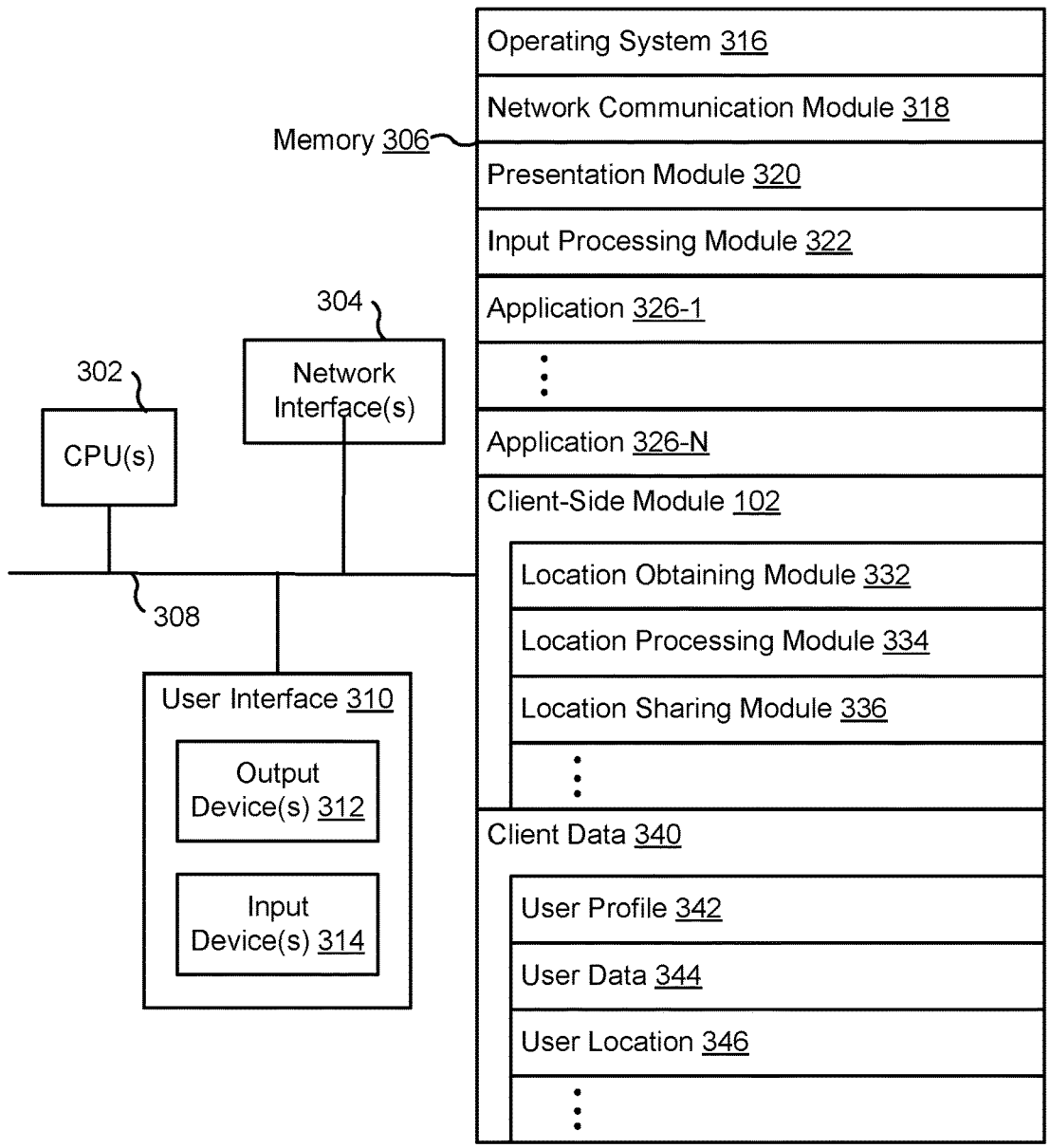
FIG. 3 is a block diagram of a client device in accordance with some embodiments.

FIG. 3 is a block diagram illustrating a representative client device 104 associated with a user in accordance with some embodiments. Client device 104, typically, includes one or more processing units (CPUs) 302, one or more network interfaces 304, memory 306, and one or more communication buses 308 for interconnecting these components (sometimes called a chipset). Client device 104 also includes a user interface 310. User interface 310 includes one or more output devices 312 that enable presentation of media content, including one or more speakers and/or one or more visual displays. User interface 310 also includes one or more input devices 314, including user interface components that facilitate user input such as a keyboard, a mouse, a voice-command input unit or microphone, a touch screen display, a touch-sensitive input pad, a camera, a gesture capturing camera, or other input buttons or controls. Furthermore, some client devices 104 use a microphone and voice recognition or a camera and gesture recognition to supplement or replace the keyboard.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

operating system 316 including procedures for handling various basic system services and for performing hardware dependent tasks;

network communication module 318 for connecting client device 104 to other computing devices (e.g., server system 108 and external service(s) 122) connected to one or more networks 110 via one or more network interfaces 304 (wired or wireless);

presentation module 320 for enabling presentation of information (e.g., a user interface for a social networking platform, widget, webpage, game, and/or application, audio and/or video content, text, etc.) at client device 104 via one or more output devices 312 (e.g., displays, speakers, etc.) associated with user interface 310;

input processing module 322 for detecting one or more user inputs or interactions from one of the one or more input devices 314 and interpreting the detected input or interaction;

one or more applications 326-1-326-N for execution by client device 104 (e.g., games, application marketplaces, payment platforms, social network platforms, and/or other applications); and client-side module 102, which provides client-side data processing and functionalities for location sharing, including but not limited to:

location obtaining module 332 for obtaining location information of a user associated with the client device;

location processing module 332 for processing location information of the user; and location sharing module system 332 for sending location information to the server system (e.g., server system 108) for sharing among one or more users; and client data 340 storing data of a user associated with the client device, including, but is not limited to:

user profile 342 storing a user profile associated with the user of client device 104 including a user/account name or handle, login credentials for location sharing, payment data (e.g., linked credit card information, app credit or gift card balance, billing address, shipping address, etc.), custom parameters (e.g., age, location, hobbies, etc.) for the user, social network contacts, groups of contacts to which the user belongs, and identified trends and/or likes/dislikes of the user;

user data 344 storing data authored, saved, liked, or chosen as favorites by the user of client device 104 in a social networking platform; and user location 346 storing location information of the user of the client device, including current location information and previous location information.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

In some embodiments, at least some of the functions of server system 108 are performed by client device 104, and the corresponding sub-modules of these functions may be located within client device 104 rather than server system 108. In some embodiments, at least some of the functions of client device 104 are performed by server system 108, and the corresponding sub-modules of these functions may be located within server system 108 rather than client device 104. Client device 104 and server system 108 shown in FIGS. 2-3, respectively, are merely illustrative, and different configurations of the modules for implementing the functions described herein are possible in various embodiments.

Figure 4A:
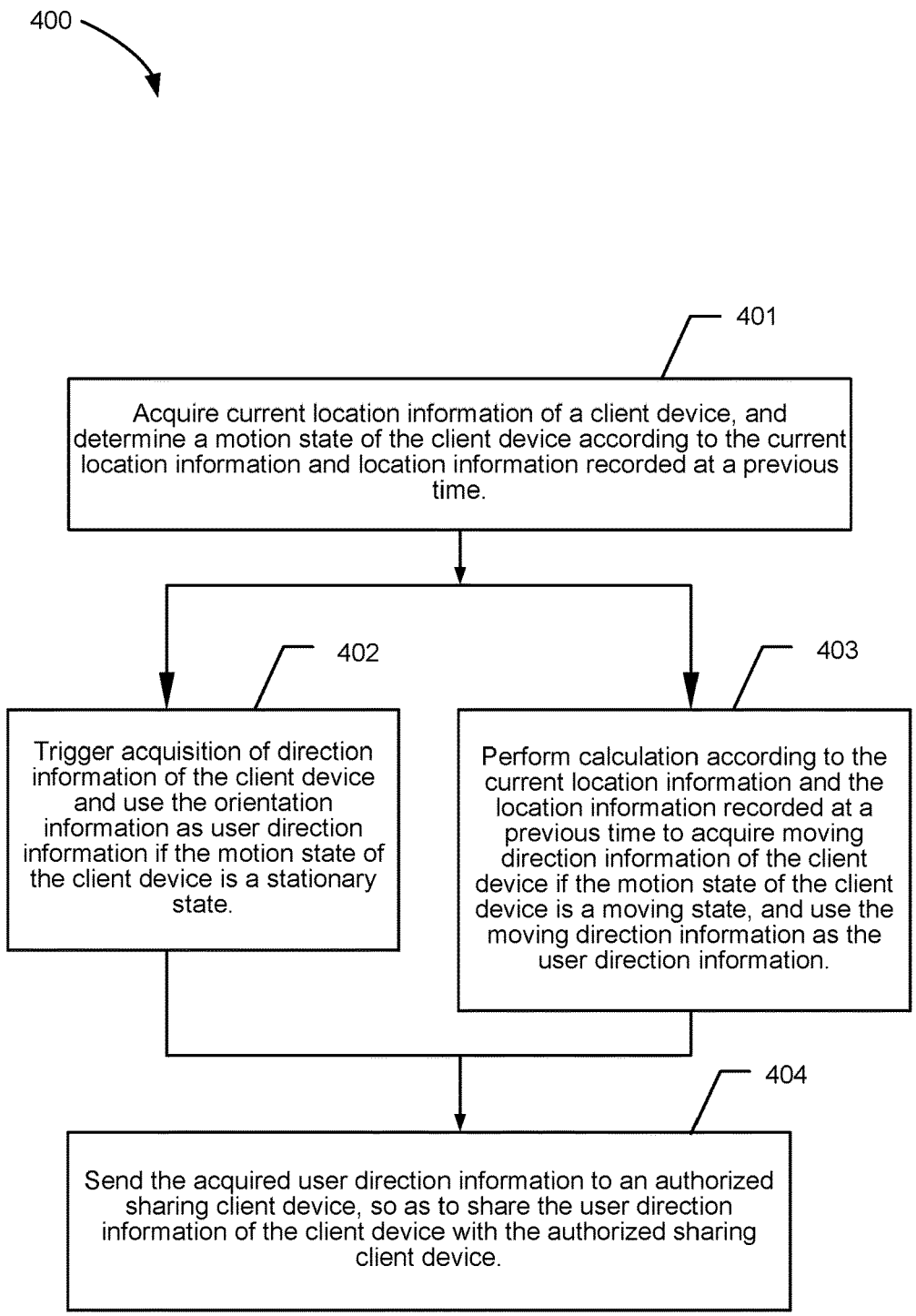
FIG. 4A is a schematic flow chart of a method for sharing user information (e.g., location information) in accordance with some embodiments.

FIG. 4A is a flow chart of a method 400 for sharing user information in accordance with some embodiments. The method 400 of the present application is applicable to any suitable client device 104, such as a smart mobile terminal, such as a smart phone, a tablet computer, and a smart wearable device, that has a network function, and is also applicable to a server system for an instant messaging application, a social application, and the like, where the server system determines user information of a client terminal. Specifically, the method includes acquiring (401) current location information of a client device, and determining (401) a motion state of the client device according to the current location information and location information recorded at a previous time.

The current location information, such as latitude and longitude information, of the client device, may be acquired using a positioning module, such as a global positioning system (GPS) module or a base station positioning module, of the client device. In the embodiment of the present application, the client device may periodically invoke the positioning module to acquire the current location information of the client device. The current location information of the client device may also be acquired in response to a triggering event associated with a user of the client device. For example, when it is detected that a user turns on a user information sharing function, the GPS module or base station positioning module or the like is invoked to acquire the current location information of the user terminal.

Location information acquired each time may be saved according to a time value of acquisition, so as to determine location information acquired at a current time and location information acquired at a previous time. In the embodiment of the present application, the motion state of the client device may include a stationary state and a moving state. A motion state of the client device may be determination based on a moving speed; for example, when a moving speed of a client device determined according to location information of two distinct times and a time interval is lower than a velocity threshold, e.g., 2 m/s, the motion state of the client device can be determined as a stationary state. When the moving speed is determined to be higher than the velocity threshold, e.g., 2 m/s, the motion state of the client device is determined to be a moving state. The motion states may be determined based on different speed thresholds in accordance with the user requirements.

Method 400 also includes triggering (402) acquisition of direction information of the client device and use the orientation information as user direction information if the motion state of the client device is determined to be a stationary state.

Method 400 also includes performing (403) calculation according to the current location information and the location information recorded at a previous time to acquire moving direction information of the client device if the motion state of the client device is determined to be a moving state, and use the moving direction information as the user direction information.

In some implementations, when the client device is in a stationary state, an electronic compass in the client device can be triggered and invoked to acquire a direction of the current direction of the client device, e.g., an angle of a direction to which the client device is pointing at relative to the true north direction, and then the direction information is used as position information of the user. In some embodiments, the position information of the user may also be acquired by using a module such as a gyroscope and an accelerometer. When the client device is in a moving state, moving direction information of the user is calculated, and the moving direction information is used as the user direction information.

Method 400 further includes sending (404) the acquired user direction information to an authorized sharing client device, so as to share the user direction information of the client device with another authorized sharing client device.

The acquired direction information or moving direction information may be shared with one or more friend users by any suitable methods, such as an instant messaging application, a social application, and/or the like. The server system may, according to a user ID of the client device, determine one or more other user IDs authorized by the user, and then send the direction information or moving direction information of the user to other one or more authorized client devices. The mobile terminal may also first send the user direction information to the application server, and then the server sends the user direction information to one or more corresponding authorized users.

It some embodiments, one or more processes of method 400 may be performed by a client device, and the client device may, periodically or without user's trigger, acquire its own location information, perform calculation processing to obtain user information of orientation information or moving direction information, and share the user information of orientation information or moving direction information with other users. When the method 400 is executed by a server system, the server system may also periodically send an instruction to perform acquisition of the location information of the client device, and deliver the instruction to acquire orientation information of the client device after the motion state of the client device is determined, or the server system calculates a moving direction of the client device, so as to share user information of the client device with other users.

The embodiment of the disclosed technology can determine an activity state of a user based on a location change of a client device, obtain user information, including an orientation or a moving direction, that can indicate a user position in different acquisition states, and share the user information with other users, so that quick and effective sharing of position information is achieved with a low cost, and a few software and hardware occupied.

Figure 4B:
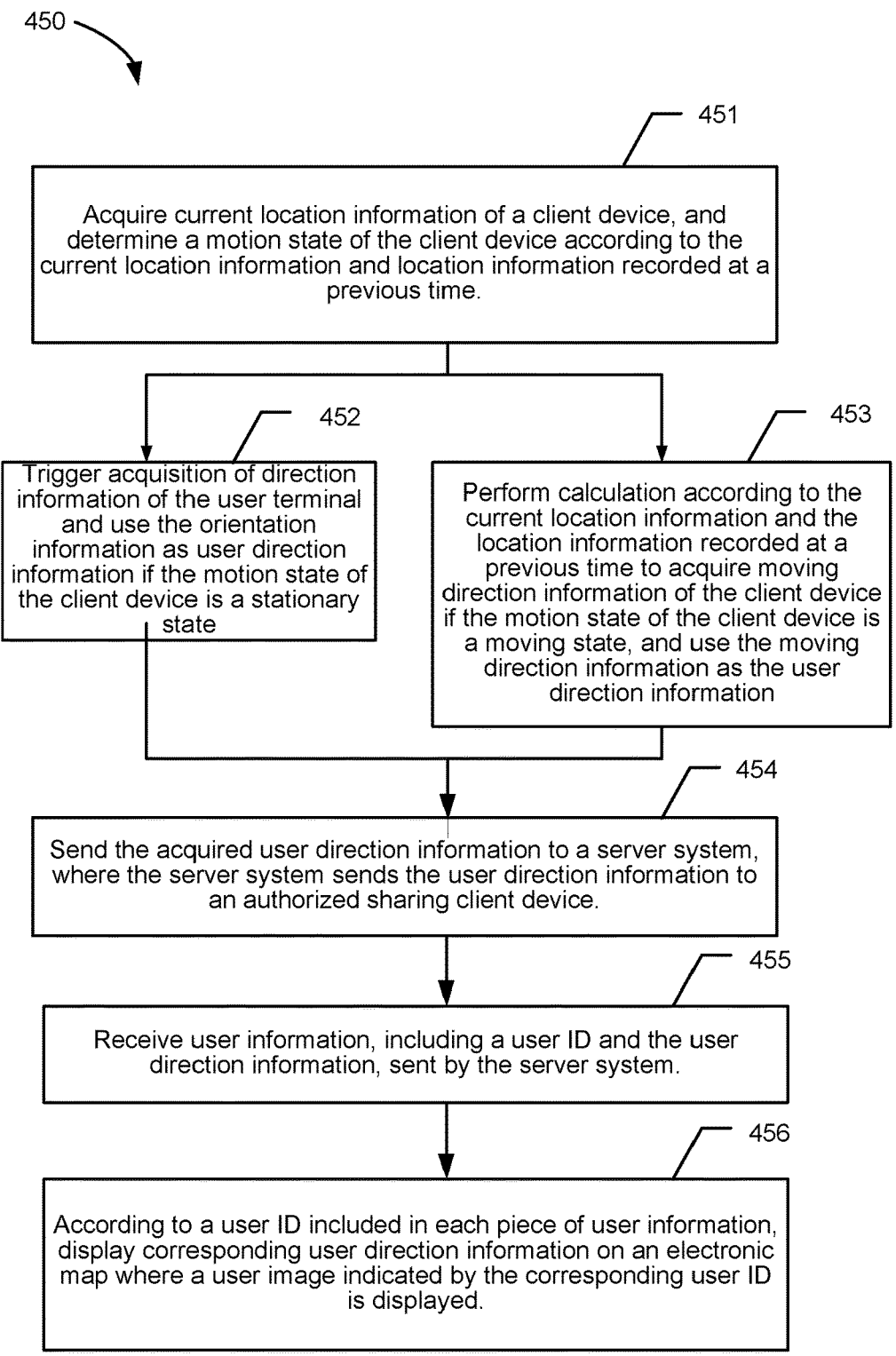
FIG. 4B is a schematic flow chart of a method for sharing user information in accordance with some embodiments.

FIG. 4B is a flow chart of a method 450 for sharing user information in accordance with some embodiments. The method 450 according to the embodiment of the disclosed technology is applicable to a client device, such as a smart phone, a tablet computer, and a smart wearable device, that has a network function. Method 450 includes acquiring (451) current location information of a client device, and determining (451) a motion state of the client device according to the current location information and location information recorded at a previous time.

Method 450 may include: triggering acquisition of the current location information obtained by a positioning module arranged in the client device when arrival of a preset sharing cycle time is detected; acquiring location information recorded in a previous sharing cycle time; calculating a moving speed of the client device by combining the current location information and the location information in the previous sharing cycle time with the preset sharing cycle time; and if the moving speed is lower than a preset speed threshold, determining that the client device is in a stationary state, and otherwise, determining that the user terminal is in a moving state. Location information of two times may also be acquired and the motion state is determined when it is detected that the user launches a user information sharing operation about a user position.

Method 450 further includes triggering (452) acquisition of direction information of the client device and use the orientation information as user direction information if the motion state of the client device is a stationary state.

In some embodiments, method 450 may include: triggering acquisition of orientation information of the client device obtained by an electronic compass module arranged in the client device if the motion state of the client device is a stationary state; and determining the acquired orientation information as the user direction information of the client device.

Method 450 further includes performing (453) calculation according to the current location information and the location information recorded at a previous time to acquire moving direction information of the client device if the motion state of the user terminal is a moving state, and use the moving direction information as the user direction information.

In some implementations, when the client device is in a stationary state, an electronic compass in the client device can be triggered and invoked to acquire an orientation of the current direction of the client device relative to the true north direction, and then the orientation information is used as position information of the user. The position information of the user may also be acquired based on a module such as a gyroscope and an accelerometer. When the client device is in a moving state, moving direction information of the user is calculated, and the moving direction information is used as the user direction information.

Method 450 may also include: determining moving direction information of the user terminal according to a relative direction of the current location information relative to the location information recorded at a previous time if the motion state of the user terminal is a moving state; and determining the moving direction information as the user direction information of the user terminal.

Method 450 further includes sending (454) the acquired user direction information to a server system, where the server system sends the user direction information to an authorized sharing client device. The authorized sharing client device refers to a client device corresponding to another user authorized by the user initiating sharing of the user direction information, and the user can determine one or more authorized users that can acquire the direction information of the user in a manner of registry in a server system, so that the server system determines the authorized sharing client device according to registered content.

Method 450 further includes receiving (455) user information, including a user ID and the user direction information, sent by the server system.

Method 450 further includes, according to a user ID included in each piece of user information, displaying (456) corresponding user direction information on an electronic map where a user image indicated by the corresponding user ID is displayed. While sharing the direction information of the user with other users, the client device may also receive direction information of another user shared by another user.

FIGS. 5A-5H are exemplary embodiments of user interfaces of location sharing displayed on client device 104 (e.g., a mobile phone) in accordance with some embodiments. However, one skilled in the art will appreciate that the user interfaces shown in FIGS. 5A-5H may be implemented on other similar computing devices.

Figure 5A:
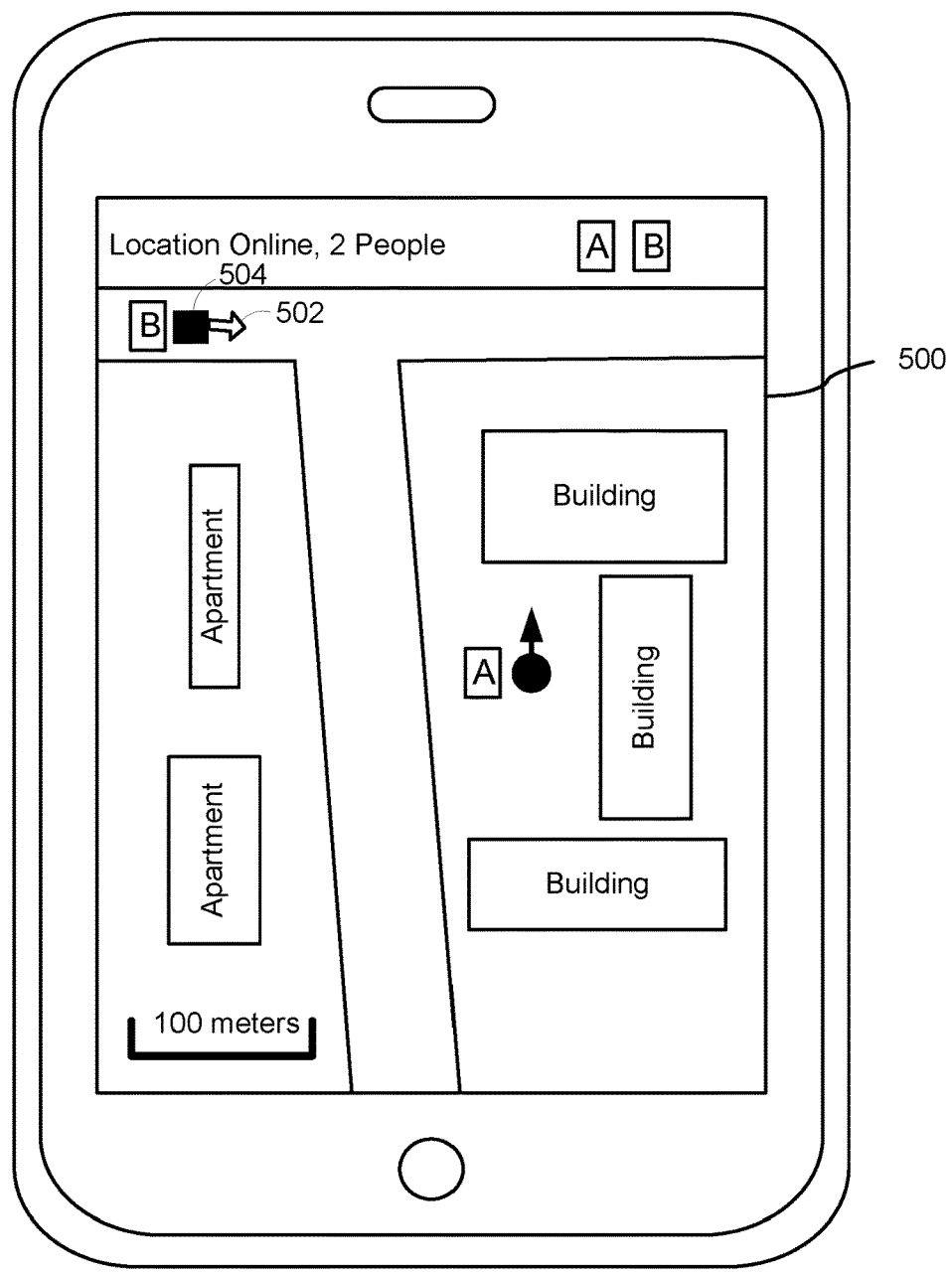
FIGS. 5A-5H are exemplary embodiments of user interfaces of location sharing in accordance with some embodiments.

FIG. 5A illustrates an embodiment of a user interface 500 for location sharing in accordance with some embodiments. As shown in FIG. 5A, location information of users A and B are shared between users A and B. In some embodiments, the user interface 500 is an electronic map interface which is shown on a client device associated with A and/or a client device associated with B respectively. In some embodiments, the user direction information may be displayed on the electronic map using in the corresponding user avatar according to the received user ID and user direction information. In some embodiments as shown in FIG. 5A, after the orientation information or the moving direction information is determined, the direction information of a user is displayed with a short arrow. For example, it is shown on the map interface 500 that the moving direction 502 of the user B 504 is eastward, and an orientation direction of the user A is facing north.

An motion state of a user can be determined based on a location information change of a client device, quickly and effectively obtain user information, including an orientation or a moving direction, that can indicate a user position in different acquisition states based on an orientation determination module such as a compass and a positioning module such as GPS that are included in the client device, and share the user information with other users, so that quick and effective sharing of position information is achieved, cost is low, and a few software and hardware resources are occupied.

Figure 5B:
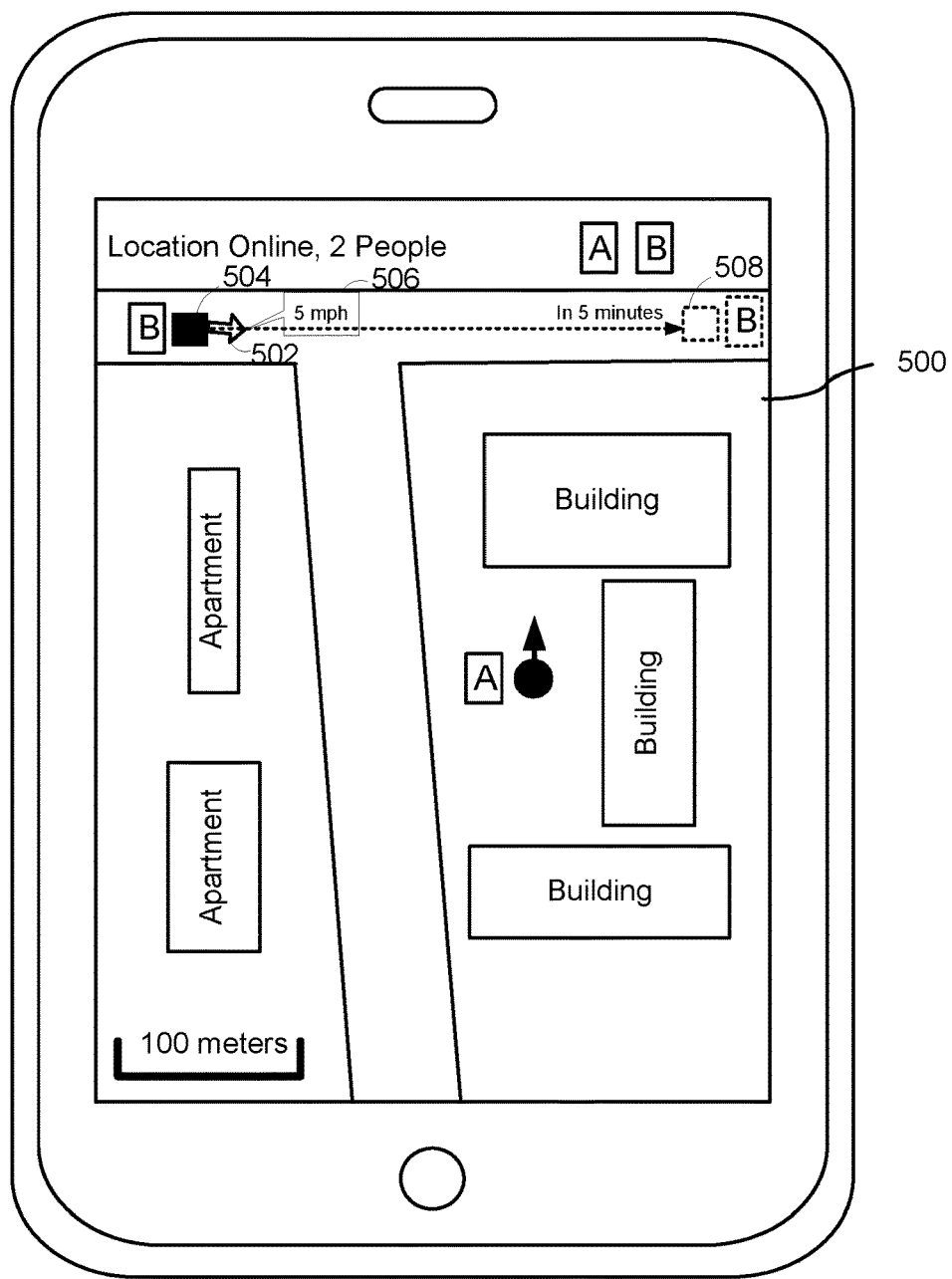

In some embodiments, when a user is determined to be in a motion state, a calculated velocity of the user may be displayed on the map interface, and a future location may also be predicted and displayed on the map interface. As shown in FIG. 5B, when user B is determined to be in a moving state, based on the current location information and the previous location information of user B and a traveling time from the previous location to the current location, a velocity of user B can be calculated. In some embodiments, a calculated velocity 506 of user B is displayed on the map interface 500. In some embodiments, a future location 508 of user B is also shown on the map interface 500, and the future location is predicted using the calculated velocity and a predetermined time (e.g., 5 minutes)

Figure 5C:
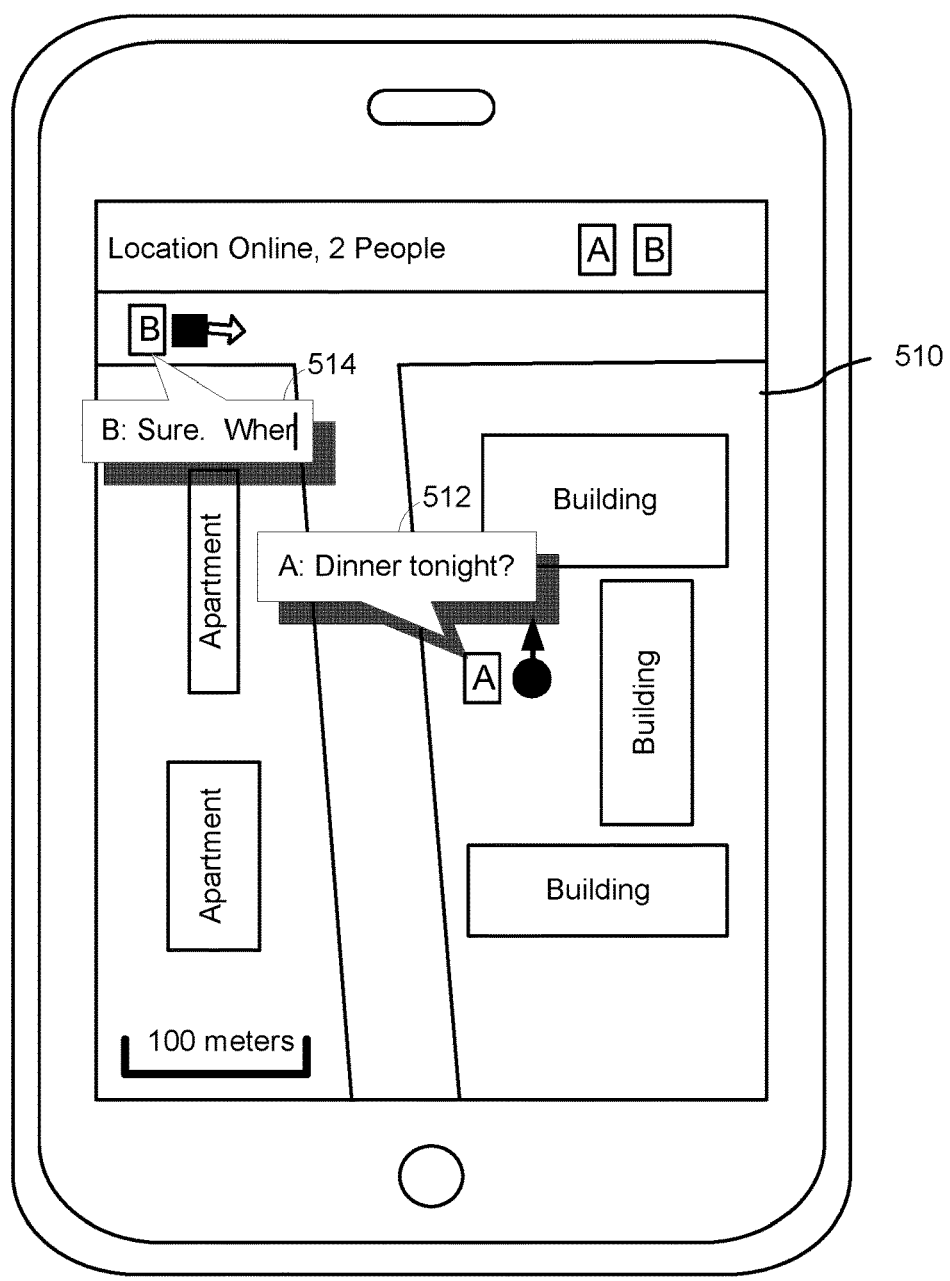

FIG. 5C illustrates an embodiment of a user interface 510 for location sharing during a chat session in accordance with some embodiments. In some embodiments, user A and user B are exchanging instant messages during a chat session while sharing the location information. As shown in FIG. 5C, one or more dialogue boxes are displayed on the map interface 510 at locations associated with the corresponding users respectively. An input box is also displayed on the map interface 510 at the current location of the user of the particular client device 104 presenting the user interface 510. For example, a dialogue box 512 associated with user A is displayed next to the icon corresponding to the user A on the map interface 500, where user A is the user of the client device showing the map interface 500. An input box 514 associated with user B is displayed next to the icon corresponding to the user B, where user B is the user with whom user A is sharing location information. In some embodiments, the map interface 500 including the dialogue box(es) and the input box can be presented in response to a detection of key words (e.g., keywords regarding planning for a gathering) in the chat messages exchanged between two or more users in a regular chat interface (e.g., a chat interface showing chat messages in dialogue bubbles without a map interface as its background).

In some embodiments, the map interface can be re-centered, in response to an instruction, over a location of a user who is currently not included on the map interface. For example, in FIG. 5D, user C shares the location information of user C with user A and user B, and user A and user B also share their respective location information as shown on a map interface 520. The map interface 520 may be shown on a client device associated with any of the users A, B, and C. In some examples, initially, the location of user C is outside of the range displayed on map interface 500 in FIG. 5A. In response to an instruction, e.g., tapping an icon 522 corresponding to user C, the map interface 520 may be re-centered over the location of user C. The scale of the map interface before and after the re-centering may or may not be identical.

Figure 5D:
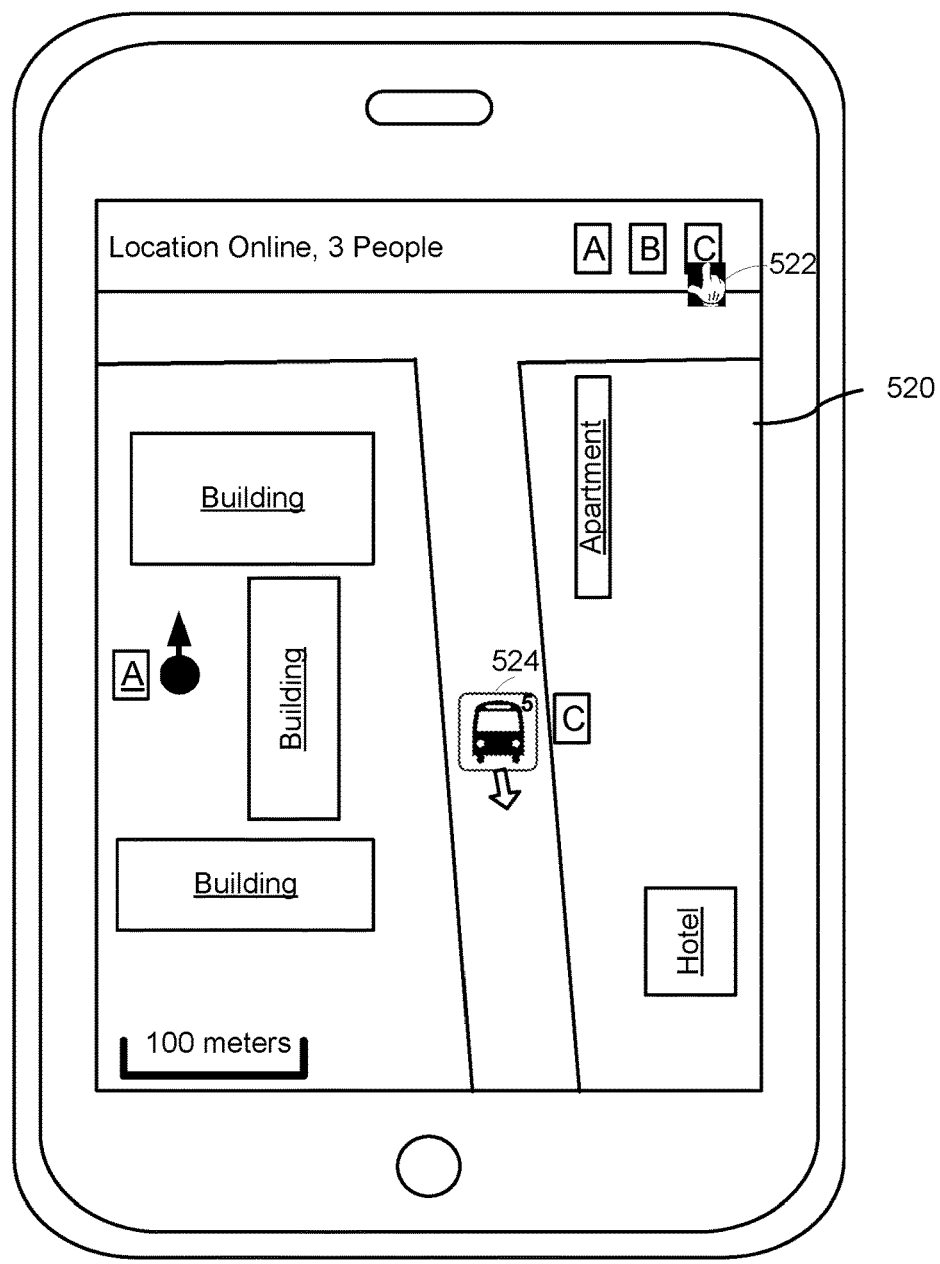

In some embodiments as shown in FIG. 5D, a transportation mode of a user can be determined when the user is in a moving state. The transportation mode may be determined in accordance with the calculated moving speed. For example as shown in FIG. 5D, when the user's moving velocity is calculated to be in a similar scale as a moving speed of a vehicle, e.g., around 40 miles/hour, the transportation mode of the user is determined to be using a vehicle, instead of walking. A corresponding transportation icon, such as vehicle icon 524, is shown on the map interface to indicate the current location, moving direction, and moving transportation mode of user C. In some embodiments, a moving route of the user can be estimated from the current location information and the previous location information. The moving route may be compared with a public transportation route, e.g., a bus route, to determine whether the user is taking a public transportation. In one example as shown in FIG. 5D, when the moving route of user C is determined to match a certain bus route (e.g., bus #5), the transportation mode of user C may be determined to be taking the corresponding bus route (e.g., bus #5), as indicated by the bus icon 524 in FIG. 5D.

Figure 5E:
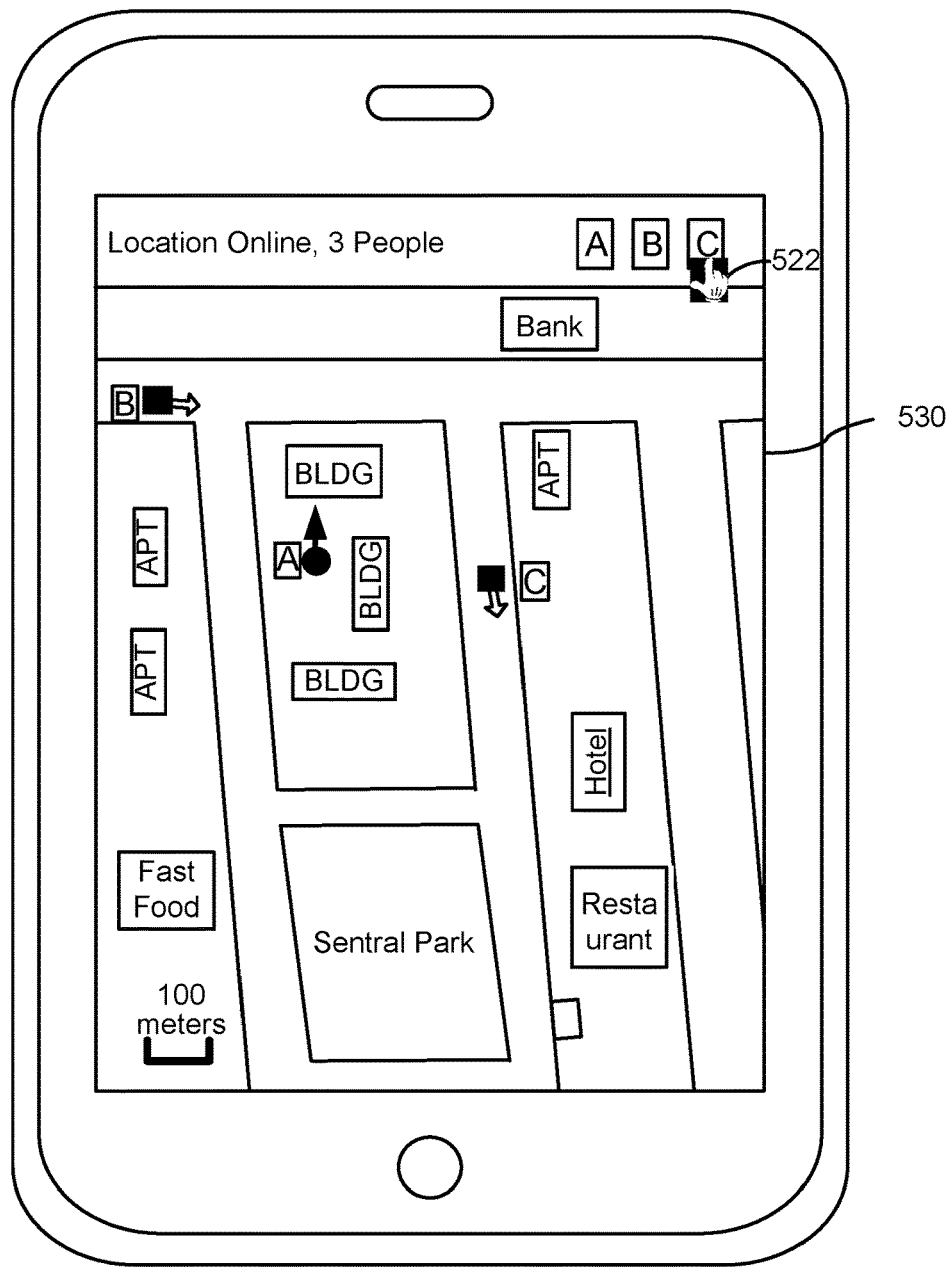

FIG. 5E illustrates an embodiment of zooming out the map interface 530, in response to an instruction (e.g., selecting a user icon 522), to include the location of the user corresponding to the selected icon on the map interface during a location sharing process. For example as shown in FIG. 5E, in response to tapping the user icon 522 associated with user C, the map interface may zoom out so that the icons corresponding to the locations of user A, user B, and user C, respectively, can be all displayed on the map interface 530. The direction information of user A, user B, and user C is also displayed on the map interface 520 as shown in FIG. 5E.

Figure 5F:
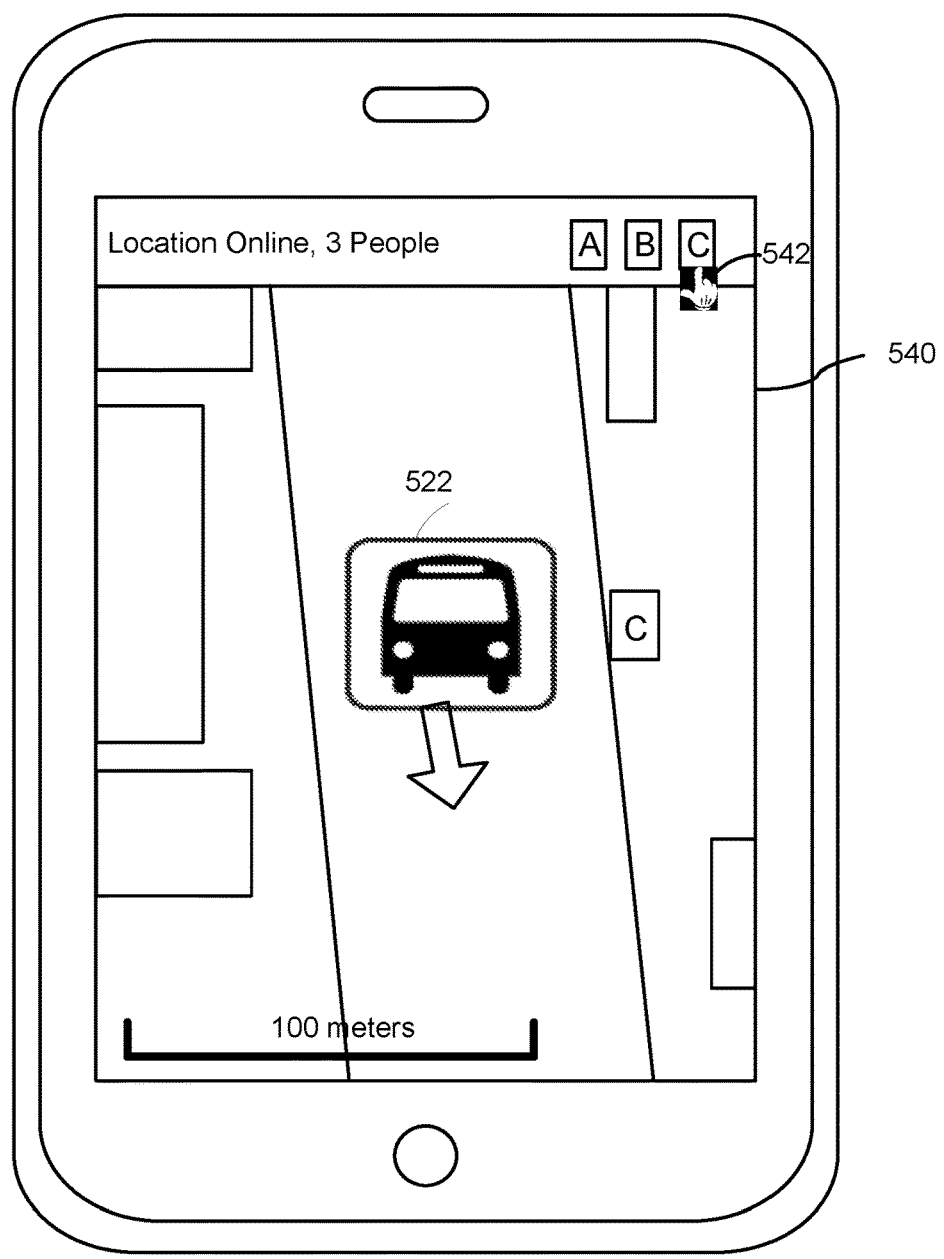

FIG. 5F illustrates an embodiment of zooming into the map interface 540, in response to an instruction (e.g., selecting a user icon 542), around the user location of the user corresponding to the selected icon on the map interface during a location sharing process. For example, in response to tapping the user icon 542 associated with user C, the map interface may zoom in so that the location information of user C is displayed on map interface 540 with a larger scale. The location information of user C includes the current location, the moving direction, and a transportation icon 522 representing the transportation mode of the user C.

Figure 5G:
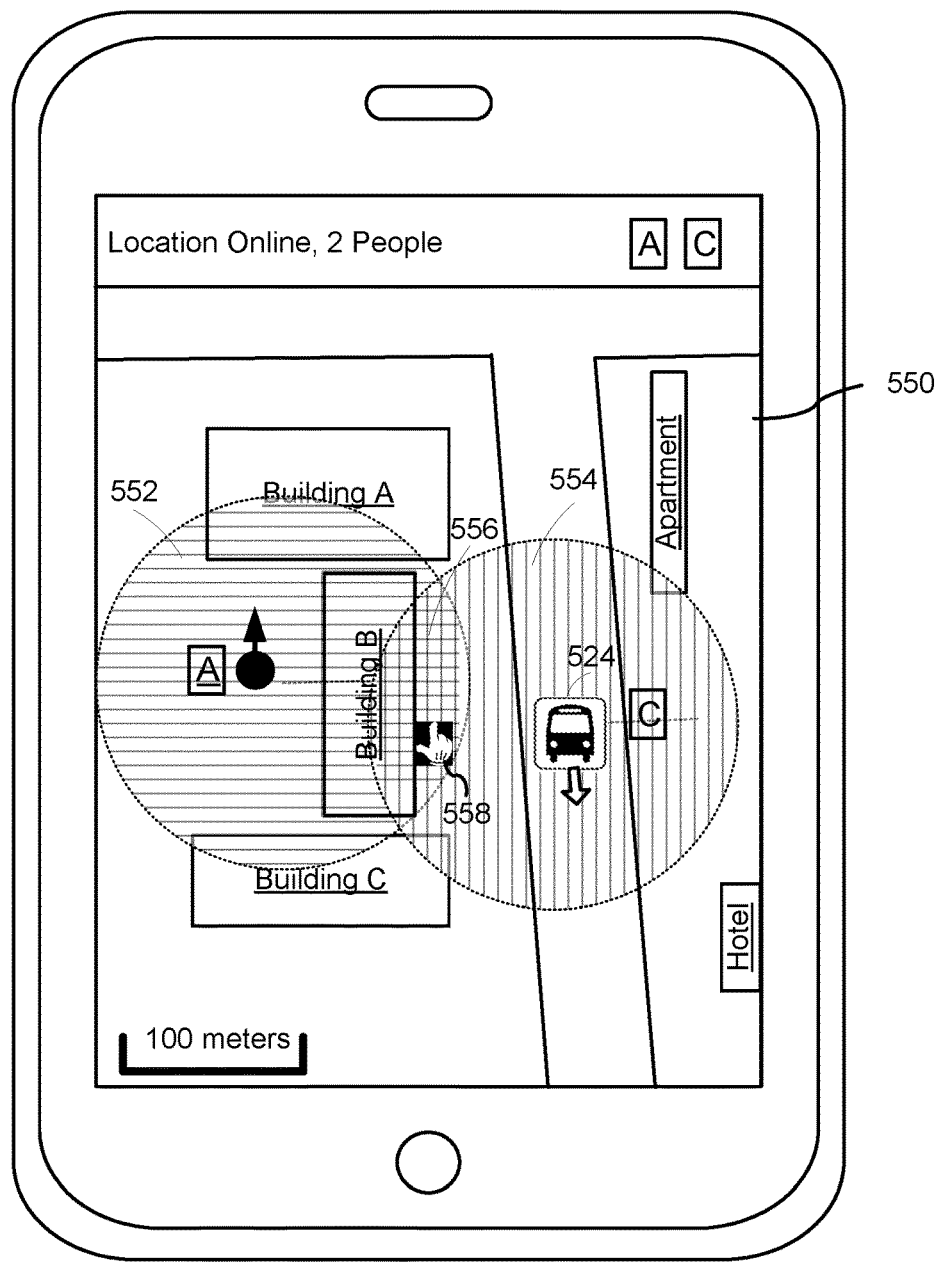
Figure 5H:
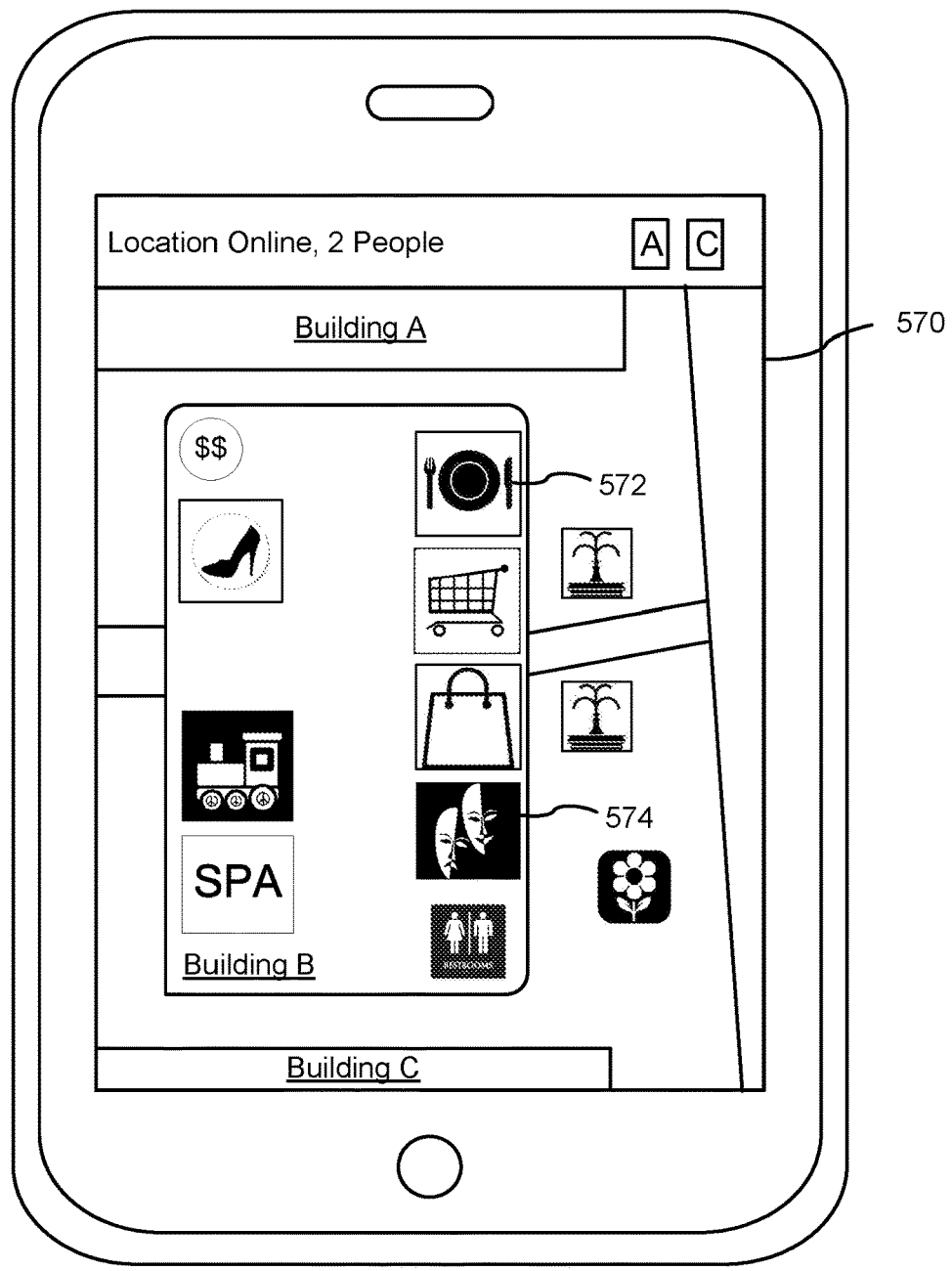
Figure 6A:
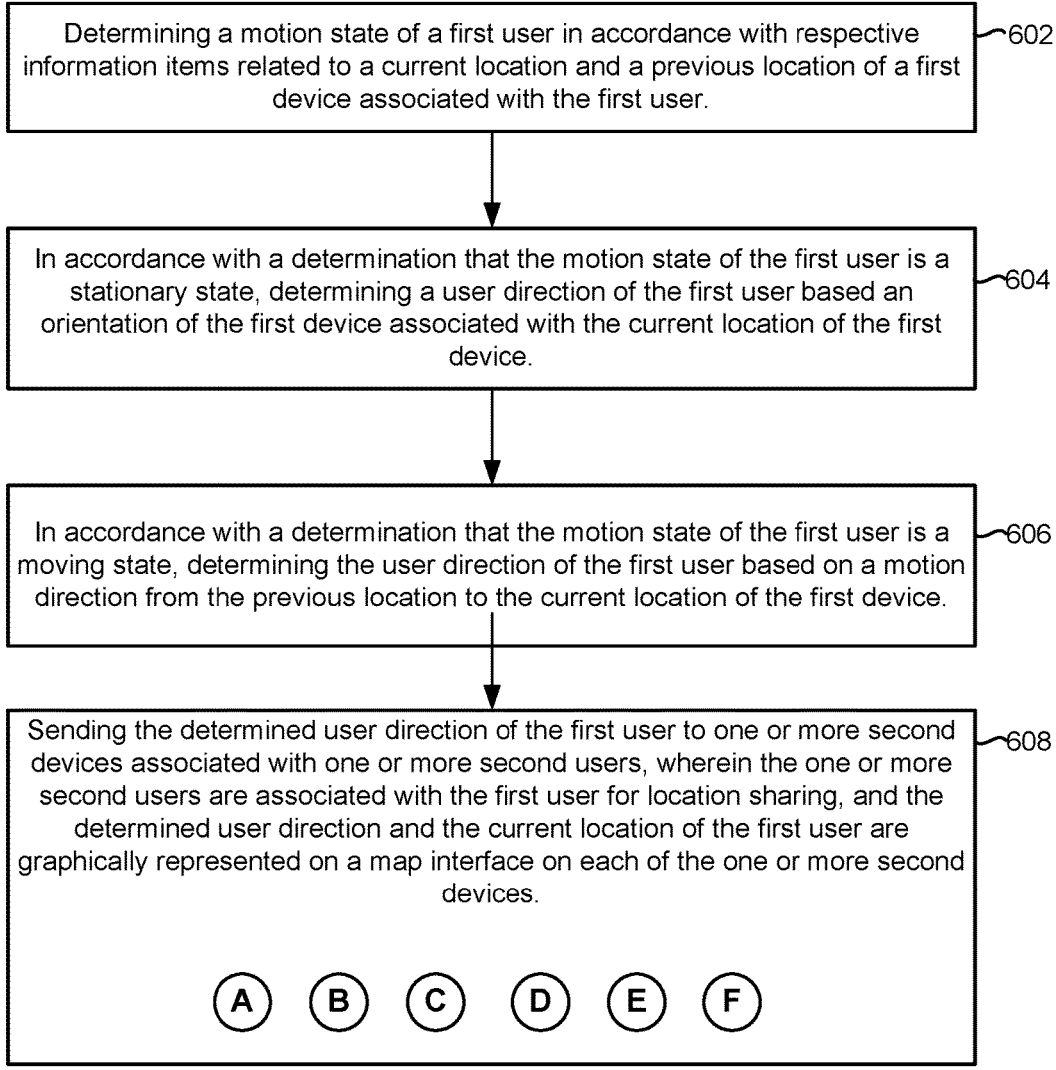
FIG. 6A-6D are a flowchart diagram of a method for location sharing in accordance with some embodiments.
Figure 6B:
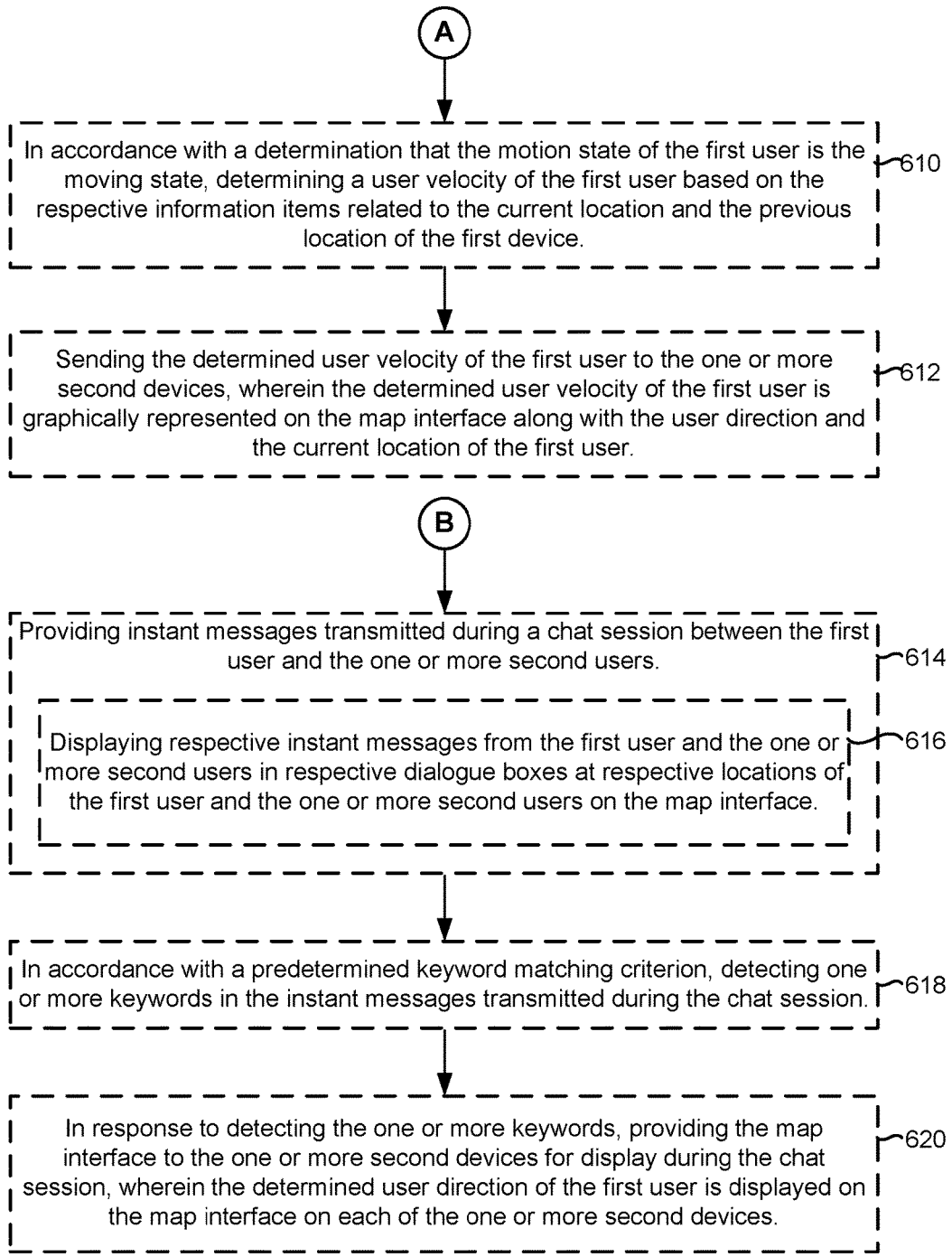
Figure 6C:
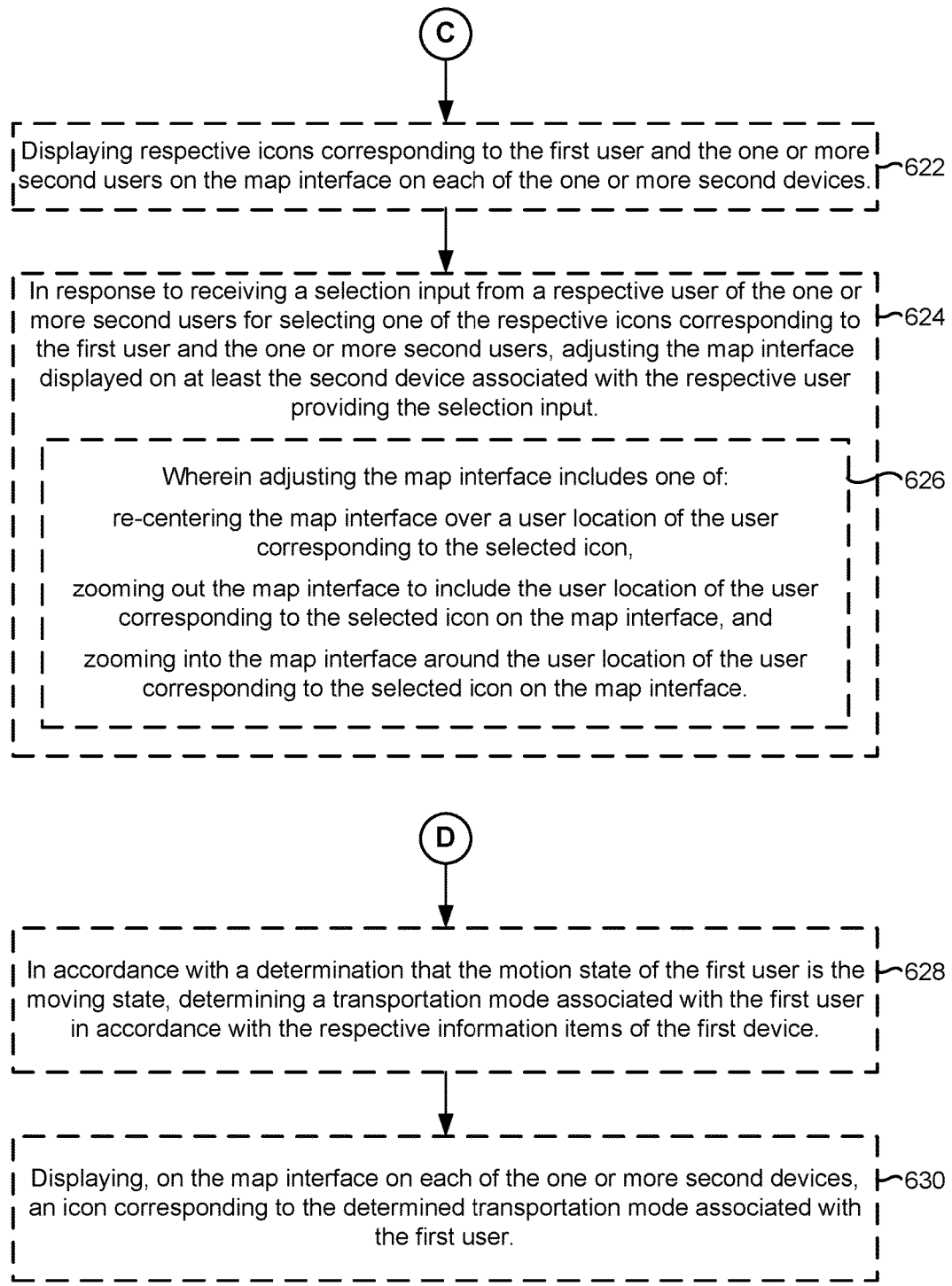
Figure 6D:
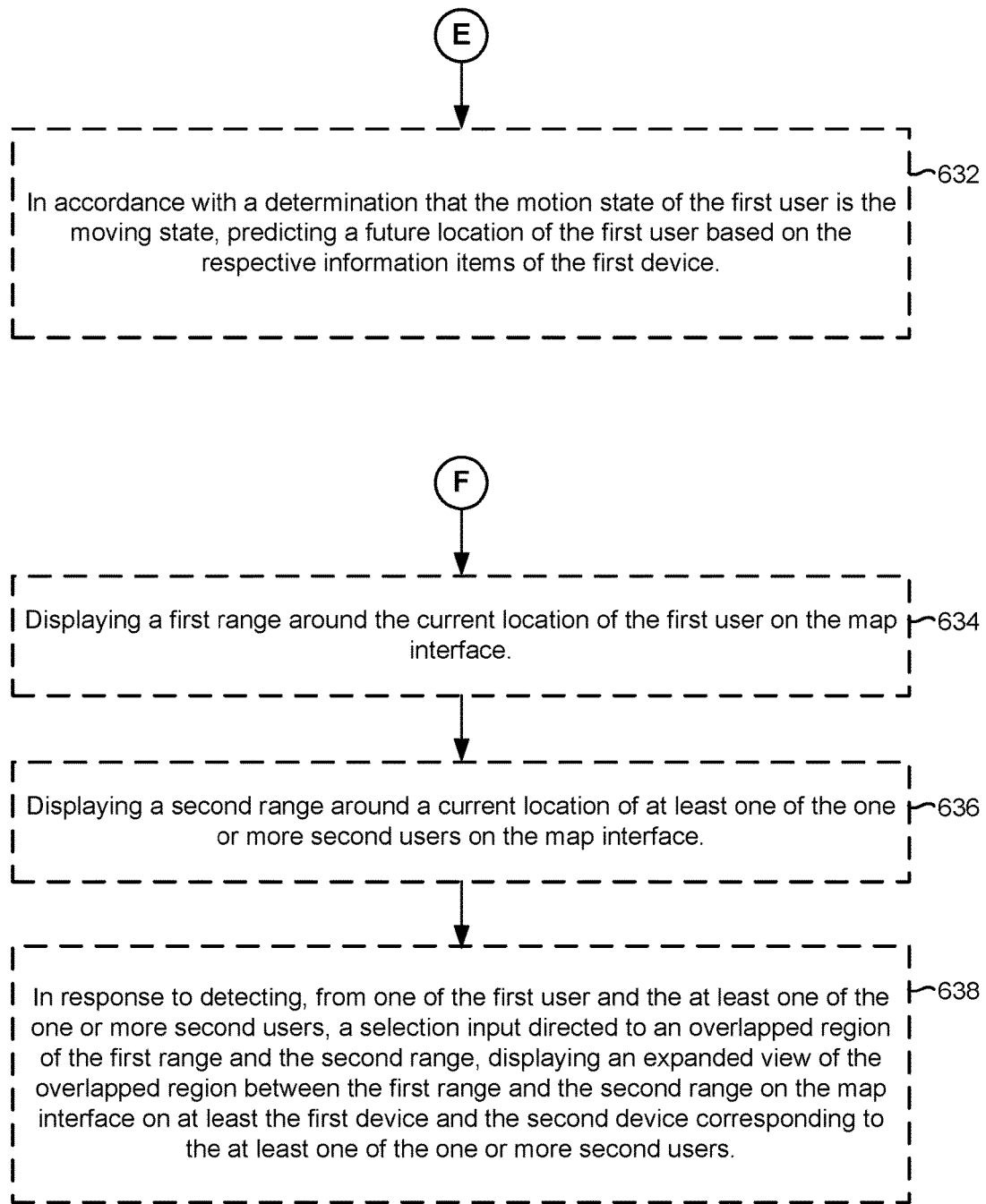

FIGS. 5G-5H further illustrate some embodiments for location sharing between two or more users, such as between user A and user C. As shown in FIG. 5G, a first range 552 around the current location of user A, and a second range 554 around the current location of user C are respectively displayed on a map interface 550. In some embodiments, the dimension of the range around a user location is predetermined by one of the two or more users who are currently sharing their locations. In some embodiments, an overlapped region 556 is shown between the first range 552 and the second range 554 on the display of the client device. A user may further send a request to have an expanded view of the overlapped region 556. For example, after a user taps (558) any part of the overlapped region 556 on the display of the client device, an expanded view 570 of the overlapped region 556 is displayed on the map interface as shown in FIG. 5H. One or more location indicators (e.g., location indicators 572, 574, etc.) of one or more businesses within the expanded view 570 of the overlapped region 556 are displayed on the map interface as shown in FIG. 5H.

FIGS. 6A-6D illustrate a flowchart diagram of a method 600 for location sharing in accordance with some embodiments. In some embodiments, method 600 is performed by a server system 108 with one or more processors and memory. For example, in some embodiments, method 600 is performed by server system 108 (FIGS. 1-2) or a component thereof (e.g., server-side module 106, FIGS. 1-2). In some embodiments, method 600 is governed by instructions that are stored in a non-transitory computer readable storage medium and the instructions are executed by one or more processors of the server system. Optional operations are indicated by dashed lines (e.g., boxes with dashed-line borders).

In method 600, a server system (e.g., server system 108, motion state determining module 232, FIG. 2) determines (602) a motion state of a first user in accordance with respective information items related to a current location and a previous location of a first device associated with the first user. In some embodiments, the respective information items comprise one or more selected from a group consisting of a latitude, an altitude, an orientation, a moving direction, and a time.

In some embodiments, the one or more information items related to the location is obtained using a positioning module, such as a global positioning system (GPS) module, an accelerometer module, and/or a gyroscope module associated with the first device. In some embodiments, the one or more information items related to the location of the first device may be obtained at a predetermined time interval, i.e., the location of the first device is obtained once every predetermined time interval. In some embodiments, the one or more information items related to the location of the first device may be obtained when the first device detects a trigger by the first user, e.g., the first user turns on a location information sharing function on the first device. In some embodiments, the one or more information items related to the location of the first device may be obtained when the server detects a registry with the server system by the first user and/or one or more second users associated with the first user, wherein the registry is triggered by detecting enabling location information sharing functions at the first device and/or the one or more second devices. In some embodiments, the one or more information items related to the location of the first device may be obtained during a chat session between the first user and the one or more second users. When the server detects one or more keywords in the conversation related to a location and/or an appointment, the server system obtains the location information of the user. For example, the conversation includes a keyword related to a location which matches a current location of the first user, or the conversation includes a keyword related to scheduling an appointment between the first user and any of the one or more second users.

In some embodiments, determining the motion state of the first user includes: (1) calculating a user velocity of the first user moving from the previous location to the current location, and (2) comparing the calculated user velocity to a predetermined velocity threshold to determine the motion state of the first user. The user velocity may be calculated by dividing a distance between the previous location and the current location, by a time span for the first user to move from the previous location to the current location. In some embodiments, in accordance with a determination that the calculated user velocity of the first user is greater than or equal to the predetermined velocity threshold, the motion state of the first user is determined to be the moving state. In some embodiments, in accordance with a determination that the calculated user velocity of the first user is smaller than the predetermined velocity threshold, the motion state of the first user is determined to be the stationary state.

In some embodiments, the distance between the previous location and the current location is calculated using the one or more information items associated with the current location and the one or more information items associated with the previous location, such as the latitude and the altitude of the current location, and the latitude and the altitude of the previous location. In some embodiments, the time span for the first user to move from the previous location to the current location is determined to be a time difference between the time associated with obtaining the one or more information items associated with the current location and the time associated with obtaining the one or more information items associated with the previous location. In some embodiments, the time span may be equal to a predetermined time interval for obtaining the location of the first device, or a time difference between the previous time when the location information sharing function is enabled by the first user and/or the one or more second users, and the current time when the location information sharing function is enabled by the first user and/or the one or more second users.

In some embodiments, prior to determining the motion state of the first user, method 600 further includes comparing a time span for the first user to move from the previous location to the current location with a predetermined time threshold. Determining the motion state of the first user is performed in accordance with a determination that the time span is equal to or smaller than the predetermined time threshold. In some embodiments, when the time span is greater than the predetermined time threshold, the location sharing may be relatively inactive. For example, when it has been a long time since the previous time when the location information sharing function is enabled, to the current time when the location information sharing function is enabled, the motion state of the first user and/or the velocity of the first user cannot be accurately determined by simply dividing the distance between the two locations by the time span between these two locations, because various motion states may happen to the first user during this time span between these two locations. Therefore under such circumstances, the server obtains one or more information items related to a next location at a next time to determine the motion state of the first user, wherein the next time for obtaining the next location may be determined to be at a predetermined time interval, which is shorter than the predetermined time threshold.

In method 600, in accordance with a determination that the motion state of the first user is a stationary state, the server system (e.g., location processing module 234 of server system 108, FIG. 2) determines (604) a user direction of the first user based an orientation of the first device associated with the current location of the first device. In accordance with a determination that the motion state of the first user is a moving state, the server system (e.g., location processing module 234 of server system 108, FIG. 2) determines (606) the user direction of the first user based on a motion direction from the previous location to the current location of the first device.

In method 600, the server system (e.g., providing module 236 of server system 108, FIG. 2) sends (608) the determined user direction of the first user to one or more second devices associated with one or more second users. The one or more second users are associated with the first user for location sharing, and the determined user direction and the current location of the first user are graphically represented on a map interface on each of the one or more second devices.

In some embodiments, in accordance with a determination that the motion state of the first user is the moving state, the server system determines (610) a user velocity of the first user based on the respective information items related to the current location and the previous location of the first device. The server system then sends (610) the determined user velocity of the first user to the one or more second devices, and the determined user velocity of the first user is graphically represented on the map interface along with the user direction and the current location of the first user, as shown in FIG. 5B.

In some embodiments, the server system provides (614) instant messages transmitted during a chat session between the first user and the one or more second users. In some embodiments, the server system displays (616) respective instant messages from the first user and the one or more second users in respective dialogue boxes at respective locations of the first user and the one or more second users on the map interface as shown in FIG. 5C. In some embodiments, an input box for typing instant messages may be displayed outside of the map interface or in the map interface, or the input can be provided via speech. In some implementations, providing the dialogue boxes and detecting the keywords for displaying the instant messages may be independent from each other, for example, the dialogue boxes can be provided on a map interface from the start, without requiring the detection of keywords first.

In accordance with a predetermined keyword matching criterion, the server system detects (618) one or more keywords in the instant messages transmitted during the chat session. In some embodiments, the predetermined criterion includes: (1) the current location of the first user matching (e.g., within a certain distance of) one or more words in the chat messages, or (2) a predetermine keyword including a keyword related to, but not limited to, an appointment, a meeting, a dinner. In response to detecting the one or more keywords, the server system provides (620) the map interface to the one or more second devices for display during the chat session, wherein the determined user direction of the first user is displayed on the map interface on each of the one or more second devices.

In some embodiments, the server system further displays (622) respective icons corresponding to the first user and the one or more second users on the map interface on each of the one or more second devices. In response to receiving selection input from a respective user of the one or more second users for selecting one of the respective icons corresponding to the first user and the one or more second users, the server system adjusts (624) the map interface displayed on at least the second device associated with the respective user providing the selection input, as shown in FIGS. 5D-5F. In some embodiments, adjusting the map interface includes (626) one of (1) re-centering the map interface over a user location of the user corresponding to the selected icon, (2) zooming out the map interface to include the user location of the user corresponding to the selected icon on the map interface, and (3) zooming into the map interface around the user location of the user corresponding to the selected icon on the map interface. The icons corresponding to the first user and the one or more second users may be displayed on a top banner above the map on the display (in this case, these icons are distinct from the icons representing the user locations/direction on the map), or may be displayed on the map corresponding to their locations.

In some implementations of re-centering the map interface, the user's location/direction indicator may or may not be visible in the map before the use's icon is selected in the banner. The re-centering can be performed by a translation of the map view from the current view, or the re-centering can be accomplished by a zooming out, such that the objects (e.g., location indicators of other users) currently in view can remain in view when the map is re-centered around the selected user's location indicator.

In some implementations of zooming into or out the map interface, the user's location/direction indicator may or may not be visible in the map before the use's icon is selected in the banner. In some embodiments, if the location indicator of the selected user is not already in view, the zooming out causes the location indicator of the selected user to come into view, while keeping the location indicators of other users already in view in the map.

In some embodiments, in accordance with a determination that the motion state of the first user is the moving state, the server system determines (628) a transportation mode associated with the first user in accordance with the respective information items of the first device. The server system then displays (630) an icon corresponding to the determined transportation mode associated with the first user on the map interface on each of the one or more second devices, as shown in FIGS. 5D and 5F.

The transportation of the first user may be determined using the moving velocity of the first user. For example, if the moving velocity is under 3 miles/hour, the first user is walking, and a pedestrian icon is shown on the map interface to indicate the first user. If the moving velocity is around 50 miles/hour, the first user is in a vehicle, and a car icon is shown on the map interface to indicate the first user. Further, by comparing the moving route of the first user with a known public transportation route, such as bus route, or rail road route, the server may further detect whether the first user is taking a public transportation and display a corresponding public transportation icon on the map interface.

In some embodiments, in accordance with a determination that the motion state of the first user is the moving state, the server system predicts (632) a future location of the first user based on the respective information items of the first device. The future location may be estimated based on the current location, current moving velocity, and the current moving direction. The estimated future location may be displayed on the map interface as shown in FIG. 5B.

In some embodiments, the server system displays (634) a first range around the current location of the first user on the map interface, and displays (636) a second range around a current location of at least one of the one or more second users on the map interface. In response to detecting a selection input directed to an overlapped region of the first range and the second range from one of the first user and at least one of the one or more second users, the server system displays (638) an expanded view of the overlapped region between the first range and the second range on the map interface on at least the first device and the second device corresponding to the at least one of the one or more second users (e.g., as shown in FIGS. 5G-5H). In some embodiments, the server system displays respective location indicators of one or more businesses within the expanded view of the overlapped region between the first range and the second range on the map interface as shown in FIG. 5H.

In some embodiments, the first range and the second range are determined by a range centered at the current location of the first user and the second user respectively with a predetermined radius. In some embodiments, the first range and the second range are determined by predicting a range of future locations based on the current moving information of the first user and the second user respectively. The at least one of the one or more second users who determines the second range and the at least one of the one or more second users who sends the selection input directed to the overlapped region may or may not be the same user. The expanded view of the overlapped region may be displayed on any of the second device associated with the user who determines the second range, or the user who sends the selection input, if they are not the same person.

Figure 7:
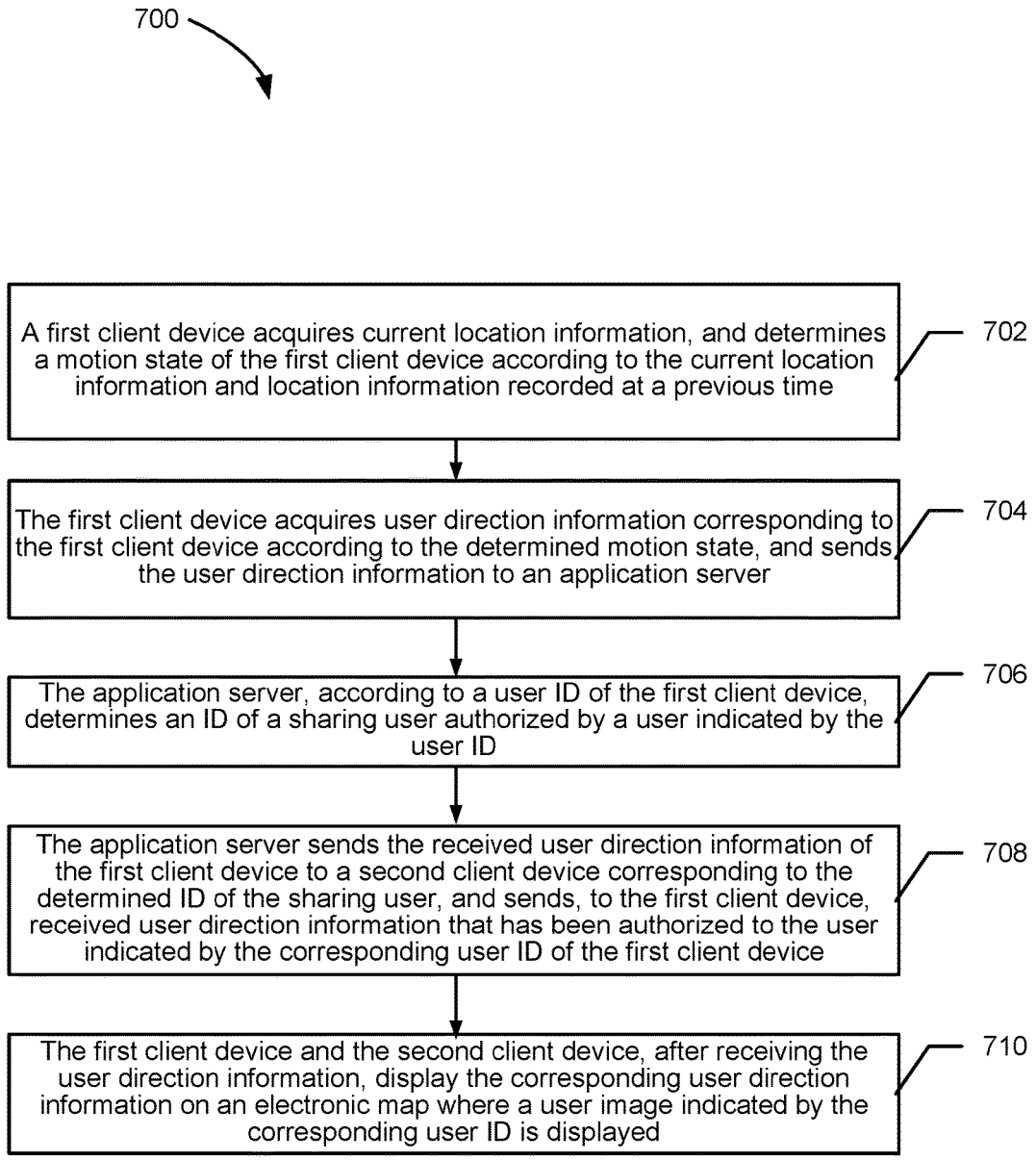
FIG. 7 is a flow chart of a method for sharing user information (e.g., location information) in accordance with some embodiments.

FIG. 7 is a schematic flow chart of a method 700 for sharing user information, such as sharing orientation information or motion information of a user through interactions between a client device and a server system. Method 700 includes a first client device acquiring (702) current location information, and determining (702) a motion state of the first user terminal according to the current location information and location information recorded at a previous time.

The current location information, such as latitude and longitude information, of the first client device, may be acquired using a positioning module, such as a GPS module or a base station positioning module, of the first user terminal. The first client device may periodically invoke the positioning module to acquire the current location information of the first user terminal. Certainly, the current location information of the first client device may also be acquired in the case of user trigger; for example, when it is detected that a user turns on a user information sharing function, the GPS module or the base station positioning module or the like is invoked to acquire the current location information of the first client device.

The first client device may save location information acquired each time according to a time value of acquisition, so as to determine location information acquired at a current time and location information acquired at a previous time in process 704. In some embodiments, the motion state of the first client device may include a stationary state and a moving state. A specific manner of determining a motion state may be determination based on a moving speed; for example, when a moving speed of a user determined according to location information of two times and a time interval is lower than 2 m/s, it can be determined as a stationary state, whereas it is determined as a moving state when the moving speed is higher than or equal to 2 m/s. Certainly, based on user requirements, various motion states may be determined based on different speed thresholds.

The first client device acquires (704) user direction information corresponding to the first client device according to the determined motion state, and sends the user direction information to a server system. In some embodiments, acquisition orientation information of the first client device is triggered and the orientation information is used as user direction information if the motion state of the first client device is a stationary state. Calculation is performed according to the current location information and the location information recorded at a previous time to acquire moving direction information of the first client device if the motion state of the first client device is a moving state, and the moving direction information is used as the user direction information.

The server system determines (706) an ID of a sharing user authorized by a user indicated by the user ID according to a user ID of the first user terminal. The authorized sharing user refers to another user authorized by the user initiating sharing of the user direction information, and the user can determine one or more authorized users that can acquire user direction information in a manner of registry with the server system, so that the server system determines the authorized sharing terminal according to registered content.

The server system sends (708) the received user direction information of the first client device to a second client device corresponding to the determined ID of sharing user, and sends, to the first client device, received user direction information that has been authorized to the user indicated by the corresponding user ID of the first client device.

The first client device and the second client device, after receiving the user direction information, display (710) the corresponding user direction information on an electronic map where a user image indicated by the corresponding user ID is displayed. While sharing the local user direction information, the client device may further receive user direction information shared by other users.

The embodiment of the present application can determine a motion state of a user based on a location change of a client device, obtain user information, including an orientation or a moving direction, that can indicate a user position in different acquisition states, and share the user information with other users, so that quick and effective sharing of position information can be achieved with a low cost and a few software and hardware resources.

Figure 8:
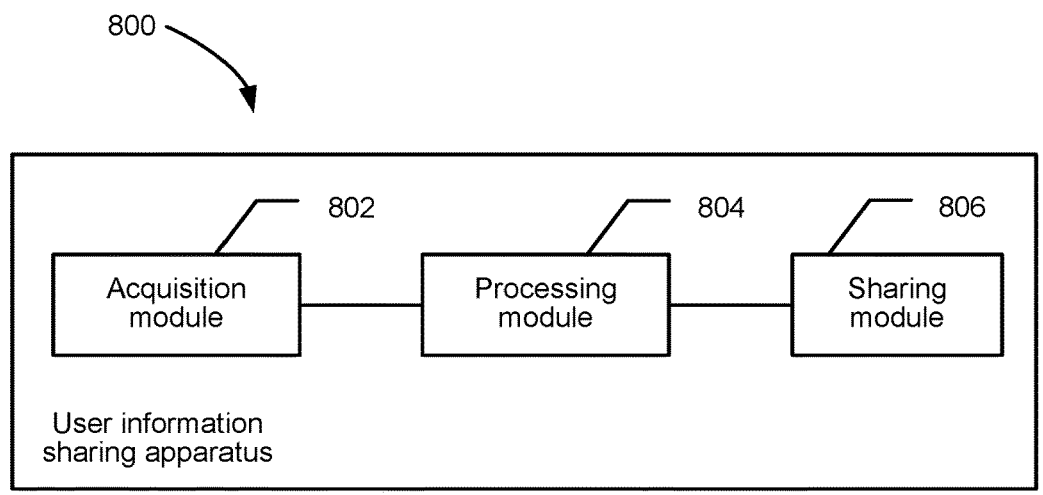
FIG. 8 is a schematic structural view of a device used for user information sharing (e.g., location information sharing) in accordance with some embodiments.

FIG. 8 is a schematic structural view of a device 800 used for sharing user information in accordance with some embodiments. The device is applicable to a smart mobile terminal, such as a smart phone, a tablet computer, and/or a smart wearable device. The device 800 has a network function, and is also applicable to a server system for an instant messaging application, a social application, and the like, where the server system determines user information of a user terminal. Device 800 includes an acquisition module 802 for acquiring current location information of a client device, and determining a motion state of the client device according to the current location information and location information recorded at a previous time. Device 800 also includes a processing module 804, for triggering acquisition of orientation information of the client device and using the orientation information as user direction information if the motion state of the client device is a stationary state, performing calculation according to the current location information and the location information recorded at a previous time to acquire moving direction information of the user terminal if the motion state of the user terminal is a moving state, and using the moving direction information as the user direction information. Device 800 also includes a sharing module 806 for sending the acquired user direction information to an authorized sharing terminal, so as to share the user direction information of the client device with the authorized sharing client device.

The acquisition module 802 may specifically acquire the current location information, such as latitude and longitude information, of the client device using a positioning module, such as a GPS module or a base station positioning module, of the client device. The acquisition module 802 may periodically invoke the positioning module to acquire the current location information of the client device. Certainly, the acquisition module 802 may also acquire current location information of the client device in the case of user trigger; for example, when detecting that a user turns on a user information sharing function, the acquisition module 802 invokes the GPS module or base station positioning module or the like to acquire the current location information of the client device.

Location information acquired each time may be saved according to a time value of acquisition, so that the acquisition module 802 determines location information acquired at a current time and location information acquired at a previous time. The motion state of the client device determined by the acquisition module 802 may include a stationary state and a moving state. A specific manner of determining a motion state may be determination based on a moving speed; for example, when a moving speed of a user determined according to location information of two times and a time interval is lower than 2 m/s, it can be determined as a stationary state, whereas it is determined as a moving state when the moving speed is higher than or equal to 2 m/s. Certainly, based on user requirements, various motion states may be categorized based on different speed thresholds.

In some implementations, when the client device is in a stationary state, the processing module 804 may trigger and invoke an electronic compass in the client device to acquire an orientation of the current direction of the client device relative to the true north direction, and then use the angle information as position information of the user. The position information of the user may also be acquired based on a module such as a gyroscope and an accelerometer. When the client device is in a moving state, the processing module 804 calculates moving direction information of the user, and uses the moving direction information as the user direction information.

The sharing module 806 may send the acquired orientation information or moving direction information to one or more users for sharing directly using an instant messaging application, a social application, and/or the like. The user direction information may also be sent to a server system according to a user ID of the client device, and the application server determines one or more other user IDs authorized by the user indicated by the user ID, and then sends the angle information or moving direction information to each authorized user. The client device may also first send the user direction information to the server system, and then the server system sends the user direction information to one or more corresponding authorized users.

Figure 9:
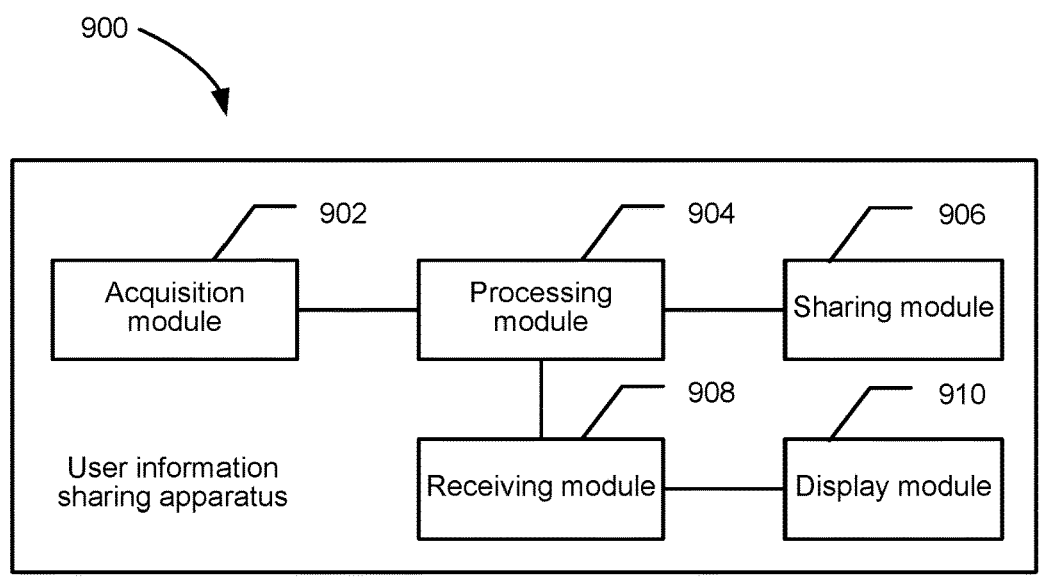
FIG. 9 is a schematic structural view of a device used for user information sharing (e.g., location information sharing) in accordance with some embodiments.

FIG. 9 is a schematic structural view of a device 900 used for sharing user information in accordance with some embodiments. Device 900 may include the acquisition module 902, the processing module 904, and the sharing module 906 which are substantially similar to acquisition module 802, processing module 804, and sharing module 806 of device 800. Device 900 may further include a receiving module 908, for receiving user information, including a user ID and user direction information, sent by a server system; and a display module 910, for displaying corresponding user direction information on an electronic map where a user image indicated by the corresponding user ID is displayed, according to a user ID included in each piece of user information.

While user direction information is shared, the receiving module 908 may receive user direction information shared by other users. After the angle information based on the true north direction is determined or the moving direction is determined, the display module 910 generates and displays an arrow indicating direction information.

Figure 10:
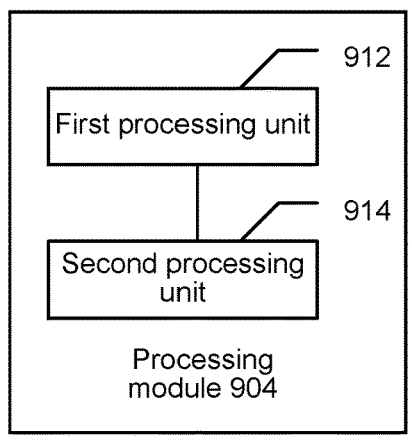
FIG. 10 is a schematic structural view of a processing module of the device as illustrated in FIG. 9 in accordance with some embodiments.

FIG. 10 is a schematic structural view of processing module 904 of device 900 as illustrated in FIG. 9 in accordance with some embodiments. Processing module 904 further includes a first processing unit 912, for triggering acquisition of orientation information of the client device obtained by an electronic compass module arranged in the client device if the motion state of the client device is a stationary state; and for determining the acquired orientation information as the user direction information of the client device. Processing module 904 also includes a second processing unit 914, for determining moving direction information of the client device according to a relative direction of the current location information relative to the location information recorded at a previous time if the motion state of the client device is a moving state, and determining the moving direction information as the user direction information of the client device.

Figure 11:
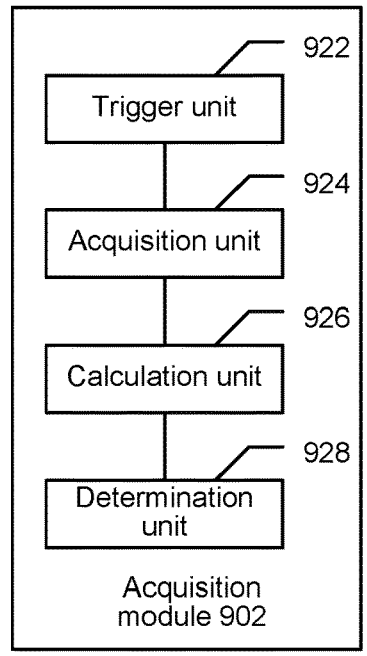
FIG. 11 is a schematic structural view of an acquisition module of the device as illustrated in FIG. 9 in accordance with some embodiments.

FIG. 11 is a schematic structural view of acquisition module 902 of device 900 as illustrated in FIG. 9 in accordance with some embodiments. The acquisition module 902 may include a trigger unit 922, for triggering acquisition of the current location information obtained by a positioning module arranged in the client device when arrival of a preset sharing cycle time is detected; an acquisition unit 924, for acquiring location information recorded in a previous sharing cycle time; a calculation unit 926, for calculating a moving speed of the client device by combining the current location information and the location information in the previous sharing cycle time with the preset sharing cycle time; and a determination unit 928, for, if the moving speed is lower than a preset speed threshold, determining that the client device is in a stationary state, and otherwise, determining that the client device is in a moving state. Further optionally, the sharing module 906 is used for sending the acquired user direction information to a server system, where the server system sends the user direction information to an authorized sharing client device.

Each of the methods described herein is typically governed by instructions that are stored in a computer readable storage medium and that are executed by one or more processors of one or more servers or client devices. The above identified modules or programs (i.e., sets of instructions) need not be implemented as separate software programs, procedures or modules, and thus various subsets of these modules will be combined or otherwise re-arranged in various embodiments.

The foregoing description, for purpose of explanation, has been described with reference to specific embodiments. However, the illustrative discussions above are not intended to be exhaustive or to limit the disclosed technology to the precise forms disclosed. Many modifications and variations are possible in view of the above teachings. The embodiments were chosen and described in order to best explain the principles of the disclosed technology and its practical applications, to thereby enable others skilled in the art to best utilize the disclosed technology and various embodiments with various modifications as are suited to the particular use contemplated.

What is claimed is:

1. A method for location sharing, comprising:
at a first device associated with a first user, the first device having one or more processors and a memory:
presenting a chat user interface including instant messages transmitted during a chat session between the first user and the one or more second users;
in accordance with a determination that the instant messages transmitted during the chat session met a predetermined keyword matching criterion and that location sharing is enabled between the first user and the one or more second users, displaying a map interface within the chat session, including:
displaying, in accordance with respective current locations of the first user and the one or more second users, a first icon representing the first user at a first location in the map interface and a second icon representing at least one of the one or more second users at a second location in the map interface;

displaying a respective instant message received from the second user in a dialogue box in proximity to the second location in the map interface that corresponds to the respective current location of the second user; and displaying an input box in proximity to the first location in the map interface that corresponds to the respective current location of the first user, wherein the input box is configured to display text input entered at the first device by the first user;

determining a motion state of a first user in accordance with respective information items related to the current location and a previous location of the first device associated with the first user;

in accordance with a determination that the motion state of the first user is a stationary state, determining a user direction of the first user based on orientation of the first device associated with the current location of the first device;

in accordance with a determination that the motion state of the first user is a moving state, determining the user direction of the first user based on a motion direction from the previous location to the current location of the first device; and displaying the determined user direction of the first user on the map interface.

2. The method of claim 1, further comprising:

in accordance with a determination that the motion state of the first user is the moving state, determining a user velocity of the first user based on the respective information items related to the current location and the previous location of the first device;

graphically representing the determined user velocity of the first user on the map interface along with the user direction and the current location of the first user; and sending the determined user velocity of the first user to one or more second devices associated with the one or more second users for display.

3. The method of claim 1, further comprising:

displaying respective icons corresponding to the first user and the one or more second users on the map interface on the first device; and in response to receiving a selection input from the first user for selecting one of the respective icons corresponding to the first user and the one or more second users, adjusting the map interface displayed on the first device, wherein adjusting the map interface includes one of:
re-centering the map interface over a user location of the user corresponding to the selected icon,
zooming out the map interface to include the user location of the user corresponding to the selected icon on the map interface, and
zooming into the map interface around the user location of the user corresponding to the selected icon on the map interface.

4. The method of claim 1, further comprising:

in accordance with a determination that the motion state of the first user is the moving state, determining a transportation mode associated with the first user in accordance with the respective information items of the first device; and displaying, on the map interface, an icon corresponding to the determined transportation mode associated with the first user.

5. The method of claim 1, further comprising:

in accordance with a determination that the motion state of the first user is the moving state, predicting a future location of the first user based on the respective information items of the first device.

6. The method of claim 1, further comprising:

displaying a first range around the current location of the first user on the map interface;

displaying a second range around a current location of at least one of the one or more second users on the map interface; and in response to detecting, from the first user, a selection input directed to an overlapped region of the first range and the second range, displaying an expanded view of the overlapped region between the first range and the second range on the map interface on the first device.

7. A first device associated with a first user and configured to share locations between the first user and one or more second users, the first device, comprising:

one or more processors; and memory storing one or more programs to be executed by the one or more processors, the one or more programs comprising instructions for:

presenting a chat user interface including instant messages transmitted during a chat session between the first user and the one or more second users;

in accordance with a determination that the instant messages transmitted during the chat session met a predetermined keyword matching criterion and that location sharing is enabled between the first user and the one or more second users, displaying a map interface within the chat session, including:

displaying, in accordance with respective current locations of the first user and the one or more second users, a first icon representing the first user at a first location in the map interface and a second icon representing at least one of the one or more second users at a second location in the map interface;

displaying a respective instant message received from the second user in a dialogue box in proximity to the second location in the map interface that corresponds to the respective current location of the second user; and displaying an input box in proximity to the first location in the map interface that corresponds to the respective current location of the first user, wherein the input box is configured to display text input entered at the first device by the first user;

determining a motion state of a first user in accordance with respective information items related to the current location and a previous location of the first device associated with the first user;

in accordance with a determination that the motion state of the first user is a stationary state, determining a user direction of the first user based on orientation of the first device associated with the current location of the first device;

in accordance with a determination that the motion state of the first user is a moving state, determining the user direction of the first user based on a motion direction from the previous location to the current location of the first device; and displaying the determined user direction of the first user on the map interface.

8. The first device of claim 7, wherein the one or more programs further comprises instructions for:
in accordance with a determination that the motion state of the first user is the moving state, determining a user velocity of the first user based on the respective information items related to the current location and the previous location of the first device;
graphically representing the determined user velocity of the first user on the map interface along with the user direction and the current location of the first user; and
sending the determined user velocity of the first user to one or more second devices associated with the one or more second users for display.

9. The first device of claim 7, wherein the one or more programs further comprises instructions for:
displaying respective icons corresponding to the first user and the one or more second users on the map interface on the first device; and
in response to receiving a selection input from the first user for selecting one of the respective icons corresponding to the first user and the one or more second users, adjusting the map interface displayed on the first device,
wherein adjusting the map interface includes one of:
re-centering the map interface over a user location of the user corresponding to the selected icon,
zooming out the map interface to include the user location of the user corresponding to the selected icon on the map interface, and
zooming into the map interface around the user location of the user corresponding to the selected icon on the map interface.

10. The first device of claim 7, wherein the one or more programs further comprises instructions for:
in accordance with a determination that the motion state of the first user is the moving state, determining a transportation mode associated with the first user in accordance with the respective information items of the first device; and
displaying, on the map interface, an icon corresponding to the determined transportation mode associated with the first user.

11. The first device of claim 7, wherein the one or more programs further comprises instructions for:
displaying a first range around the current location of the first user on the map interface;
displaying a second range around a current location of at least one of the one or more second users on the map interface; and
in response to detecting, from the first user, a selection input directed to an overlapped region of the first range and the second range, displaying an expanded view of the overlapped region between the first range and the second range on the map interface on the first device.

12. A non-transitory computer readable storage medium storing one or more programs, the one or more programs comprising instructions, which, when executed by a first device associated with a first user and having one or more processors, cause the first device to perform operations comprising:
presenting a chat user interface including instant messages transmitted during a chat session between the first user and the one or more second users;
in accordance with a determination that the instant messages transmitted during the chat session met a predetermined keyword matching criterion and that location sharing is enabled between the first user and the one or more second users, displaying a map interface within the chat session, including:
displaying, in accordance with respective current locations of the first user and the one or more second users, a first icon representing the first user at a first location in the map interface and a second icon representing at least one of the one or more second users at a second location in the map interface;
displaying a respective instant message received from the second user in a dialogue box in proximity to the second location in the map interface that corresponds to the respective current location of the second user; and
displaying an input box in proximity to the first location in the map interface that corresponds to the respective current location of the first user, wherein the input box is configured to display text input entered at the first device by the first user;
determining a motion state of a first user in accordance with respective information items related to the current location and a previous location of the first device associated with the first user;
in accordance with a determination that the motion state of the first user is a stationary state, determining a user direction of the first user based on orientation of the first device associated with the current location of the first device;
in accordance with a determination that the motion state of the first user is a moving state, determining the user direction of the first user based on a motion direction from the previous location to the current location of the first device; and
displaying the determined user direction of the first user on the map interface.

13. The non-transitory computer readable storage medium of claim 12, wherein the one or more programs further comprise instructions which cause the server system to perform operations comprising:
in accordance with a determination that the motion state of the first user is the moving state, determining a user velocity of the first user based on the respective information items related to the current location and the previous location of the first device;
graphically representing the determined user velocity of the first user on the map interface along with the user direction and the current location of the first user; and
sending the determined user velocity of the first user to one or more second devices associated with the one or more second users for display.

14. The non-transitory computer readable storage medium of claim 12, wherein the one or more programs further comprise instructions which cause the server system to perform operations comprising:
displaying respective icons corresponding to the first user and the one or more second users on the map interface on the first device; and
in response to receiving a selection input from the first user for selecting one of the respective icons corresponding to the first user and the one or more second users, adjusting the map interface displayed on the first device,
wherein adjusting the map interface includes one of:
re-centering the map interface over a user location of the user corresponding to the selected icon, zooming out the map interface to include the user location of the user corresponding to the selected icon on the map interface, and zooming into the map interface around the user location of the user corresponding to the selected icon on the map interface.

15. The non-transitory computer readable storage medium of claim 12, wherein the one or more programs further comprise instructions which cause the server system to perform operations comprising:

in accordance with a determination that the motion state of the first user is the moving state, determining a transportation mode associated with the first user in accordance with the respective information items of the first device; and displaying, on the map interface, an icon corresponding to the determined transportation mode associated with the first user.

16. The non-transitory computer readable storage medium of claim 12, wherein the one or more programs further comprise instructions which cause the server system to perform operations comprising:

displaying a first range around the current location of the first user on the map interface;

displaying a second range around a current location of at least one of the one or more second users on the map interface; and in response to detecting, from the first user, a selection input directed to an overlapped region of the first range and the second range, displaying an expanded view of the overlapped region between the first range and the second range on the map interface on the first device.

* * * * *